United States Patent
Yuan et al.

(10) Patent No.: US 12,094,362 B2
(45) Date of Patent: *Sep. 17, 2024

(54) NEURAL MODELS FOR KEY PHRASE DETECTION AND QUESTION GENERATION

(71) Applicant: Microsoft Technology Licensing, LLC, Redmond, WA (US)

(72) Inventors: Xingdi Yuan, Westmount (CA); Tong Wang, Longueuil (CA); Adam Peter Trischler, Montreal (CA); Sandeep Subramanian, Montreal, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/143,303

(22) Filed: Jan. 7, 2021

(65) Prior Publication Data
US 2021/0134173 A1    May 6, 2021

Related U.S. Application Data

(63) Continuation of application No. 15/667,911, filed on Aug. 3, 2017, now Pat. No. 10,902,738.

(51) Int. Cl.
*G09B 7/02* (2006.01)
*G06N 3/02* (2006.01)
*G06Q 50/20* (2012.01)

(52) U.S. Cl.
CPC ............... *G09B 7/02* (2013.01); *G06N 3/02* (2013.01); *G06Q 50/20* (2013.01)

(58) Field of Classification Search
CPC ............ G06N 3/02; G06Q 50/20; G09B 7/02
See application file for complete search history.

(56) References Cited

U.S. PATENT DOCUMENTS

| | | | | |
|---|---|---|---|---|
| 2006/0015317 | A1* | 1/2006 | Nakagawa | G06F 40/268 704/1 |
| 2017/0213469 | A1* | 7/2017 | Elchik | G09B 7/02 |
| 2017/0323008 | A1* | 11/2017 | Makino | G06F 16/353 |
| 2018/0329884 | A1* | 11/2018 | Xiong | G06N 3/044 |
| 2019/0361975 | A1* | 11/2019 | Mannby | G06F 3/0482 |

\* cited by examiner

*Primary Examiner* — Malina D. Blaise

(57) ABSTRACT

A method, system, and storage device storing a computer program, for generating questions based on provided content, such as, for example, a document having words. The method comprises automatically estimating the probability of interesting phrases in the provided content, and generating a question in natural language based on the estimating. In one example embodiment herein, the estimating includes predicting the interesting phrases as answers, and the estimating is performed by a neural model. The method further comprises conditioning a question generation model based on the interesting phrases predicted in the predicting, the question generation model generating the question. The method also can include training the neural model. In one example, the method further comprises identifying start and end locations of the phrases in the provided content, and the identifying includes performing a dot product attention mechanism parameterizing a probability distribution.

20 Claims, 18 Drawing Sheets

NEURAL MODELS FOR KEY PHRASE DETECTION AND QUESTION GENERATION

CROSS-REFERENCE TO RELATED APPLICATIONS

This application is a continuation application and claims priority to U.S. patent application Ser. No. 15/667,911, filed Aug. 3, 2017, entitled, "Neural Models for Key Phrase Detection and Question Generation," which application is incorporated herein by reference in their entireties.

BACKGROUND

Many educational applications can benefit from automatic question generation, including vocabulary assessment, writing support, and assessment of reading comprehension. Formulating questions that test for certain skills at certain levels requires significant human effort that is difficult to scale, e.g., to massive open online courses (MOOCs). Despite their applications, the majority of existing models for automatic question generation rely on rule-based methods that likewise do not scale well across different domains and/or writing styles.

Automatic question generation systems are often used to alleviate (or even eliminate) the burden of human generation of questions to assess reading comprehension. Various natural language processing (NLP) techniques have been adopted in these systems to improve generation quality, including parsing, semantic role labeling, and the use of lexicographic resources like WordNet. However, the majority of known methods resort to simple rule-based techniques such as slot-filling with templates or syntactic transformation heuristics (e.g., subject-auxiliary inversion). These techniques can be inadequate to capture the diversity and high variance of natural language questions.

End-to-end trainable neural models have recently been proposed for question generation in both vision and language, and can involve policy gradient techniques. Meanwhile, a less explored aspect of question generation is to identify which parts of a given document are important or interesting for asking questions. Existing studies formulate the task as a ranking problem with the help of crowdsourcing. Crowdworkers have been used to rate the acceptability of computer-generated natural language questions as quiz questions, and there has been soliciting of quality ratings of text chunks as potential gaps for Cloze-style questions.

Pointer networks are an extension of sequence-to-sequence models in which the target sequence consists of positions in the source sequence. Sequence-to-sequence models also have been employed, and an attention mechanism (derived from encoder states). Automatic question generation from a text passage has been proposed, where generated questions can be answered by certain sub-spans of a given passage. A question is generated given a document and an answer, wherein answers come from the document. Answers are manually selected by humans, which is expensive and time consuming.

SUMMARY

Non-limiting and non-exhaustive examples are described with reference to the following Figures.

Example aspects herein include at least a method, system, and storage device storing a computer program, for generating questions based on provided content, such as, for example, a document having words.

The method comprises automatically estimating the probability of interesting phrases in the provided content, and generating a question in natural language based on the estimating. In one example embodiment herein, the estimating includes predicting the interesting phrases as answers, and the estimating is performed by a neural model.

Also in one example embodiment herein, the method further comprises conditioning a question generation model based on the interesting phrases predicted in the predicting, the question generation model generating the question. The method also can include training the neural model.

In accordance with an example embodiment herein, the method further comprises identifying start and end locations of the phrases in the provided content, and the identifying includes performing a dot product attention mechanism parameterizing a probability distribution.

The method can further comprise, in one example embodiment herein, determining an attention distribution of word positions in the provided content, wherein the generating includes determining at least one word of the question based on the attention distribution.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

FIGS. 9-11 illustrate a question generation model according to an example embodiment herein, wherein FIGS. 9, 10*a* and 10*b* show an encoding model of the question generation model, and FIG. 11 shows a decoding model of the question generation model.

DETAILED DESCRIPTION

Figure 1:
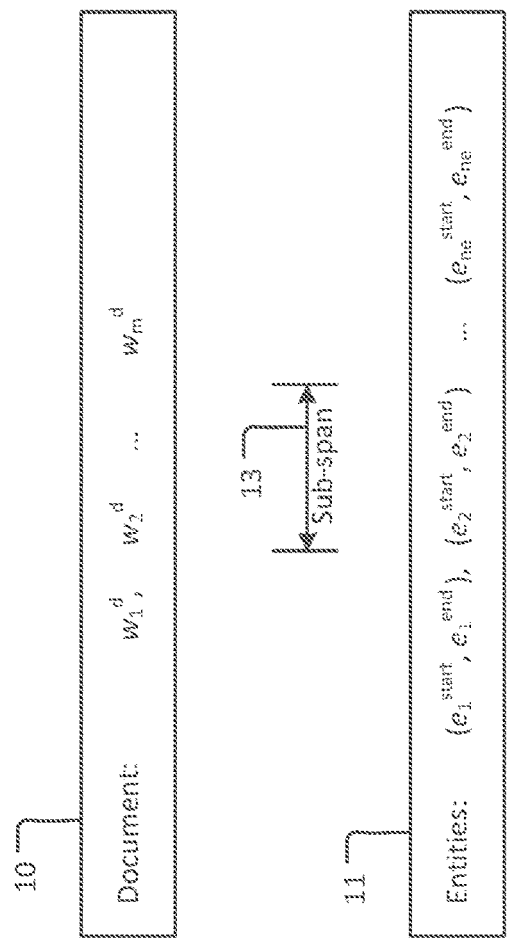
FIGS. 1-3 represent a neural entity selection model according to an example embodiment herein.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Example aspects of herein relate to end-to-end-trainable neural models for automatic question generation, such as in the context of, for example, assessment of reading comprehension. In this domain, question generation according to an example aspect herein involves multiple (e.g., two) interrelated components: first, a system to identify interesting entities or events (key phrases) within a passage or document, and second, a question generator that constructs questions in natural language that ask specifically about the given key phrases. Key phrases thus act as the "correct" answers for generated questions. This procedure ensures assessment of student performance against ground-truth targets.

In accordance with an example embodiment herein, key phrase detection is performed by modeling the probability P(a/d) of potential answers (a) conditioned on a given document (d), and a sequence-to-sequence model is employed to generate a set of key-phrase boundaries. This model can flexibly select an arbitrary number of key phrases from a document. To teach the model to assign high probability to interesting answers, the model is trained, according to an example embodiment herein, on human-selected answers from a largescale, crowd-sourced question-answering dataset (SQuAD). As such, a data-driven approach to the concept of interestingness is employed, based on the premise that crowdworkers tend to select entities or events that interest them when they formulate their own comprehension questions. A growing collection of crowd-sourced question-answering datasets can be harnessed to learn models for key phrases of interest to human readers.

Given a set of extracted key phrases, question generation is performed by modeling the conditional probability of a question given a document-answer pair, i.e., P(q/a, d). For this a sequence-to-sequence model with attention is employed, as is a pointer-softmax mechanism. This component is also trained on SQuAD, according to an example embodiment, by maximizing the likelihood of questions in the dataset.

Empirically, the model for key phrase detection outperforms at least two baseline systems by a significant margin. Prior attempts to model a distribution of key phrases based on a given document began with a prescribed list of candidates, which might significantly bias the distribution estimate. An example aspect of the present application, on the other hand, adopts a dataset that was originally designed for question answering, where crowdworkers presumably tend to pick entities or events that interest them most. The resulting distribution, learned directly from data, is more likely than prior art techniques to reflect the true importance and appropriateness of answers.

Key Phrase Detection

A sample baseline for key frame detection will now be described, as well as neural models for extracting key phrases (answers) from documents according to example embodiments herein.

Entity Tagging Baseline

One example embodiment of a baseline model (ENT) predicts all entities identified or tagged as key phrases by an information extraction technique, such as that implemented using spaCy software, for example. This is motivated by the fact that over 50% of the answers in a dataset of questions posed by crowdworkers (such as, e.g., Stanford Question Answering Dataset (SQUAD)) are entities. Entities include types of information of interest such as, for example, dates (September 1967), numeric entities (3, five), people (William Smith), locations (the British Isles) and other entities (Buddhism). SQuAD is a reading comprehension dataset, comprised of questions posed by crowdworkers on Wikipedia articles. In SQuAD, the answer to every question is a segment of text, or span, from a corresponding reading passage.

Neural Entity Selection

The baseline model above naively selects all entities as candidate answers. A drawback is that it exhibits high recall at the expense of precision (see Table 1 below). According to an example aspect herein, this is addressed by identifying entities in a document, and then training a neural model to classify, based on e.g., SQuAD, identified entities as being interesting or not interesting.

In one example embodiment herein, entities are identified using a neural entity selection model (NES) that selects a subset of entities from a list of candidates, wherein the list of candidates is determined using the information extraction technique referred to above (e.g., spaCy). In particular, and referring to representation 100 of FIG. 1, the neural entity selection model operates based a document (i.e., including a sequence of words) $D=(w_1^d, w_2^d, \ldots w_m^d)$ 10 and a list of $n_e$ entities (i.e., candidates) 11, where m is the number of words in the document and $n_e$ is the number of entities in the document. The list of entities is a sequence of entities, each of which has respective (start, end) entity locations within the document, the sequence being designated as $E=(e_1^{start}, e_1^{end}), (e_2^{start}, e_2^{end}), \ldots (e_{nc}^{start}, e_{nc}^{end})$, wherein elements 10 and 11 can be determined using, in one example embodiment, the above-mentioned information extraction technique, and wherein each entity 11 forms a sub-span 13 of the document 10 between respective (start, end) locations.

Figure 2:
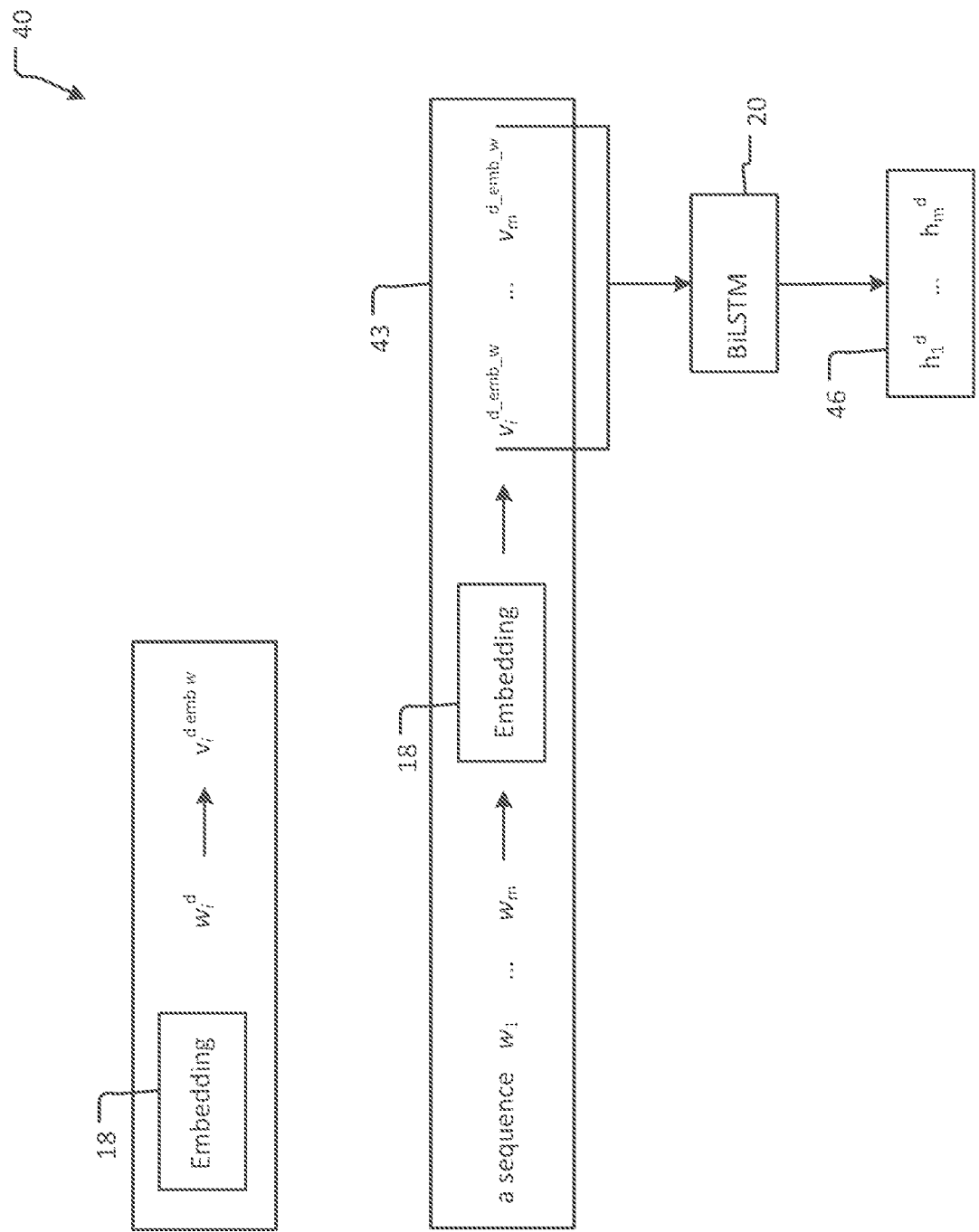
Figure 4:
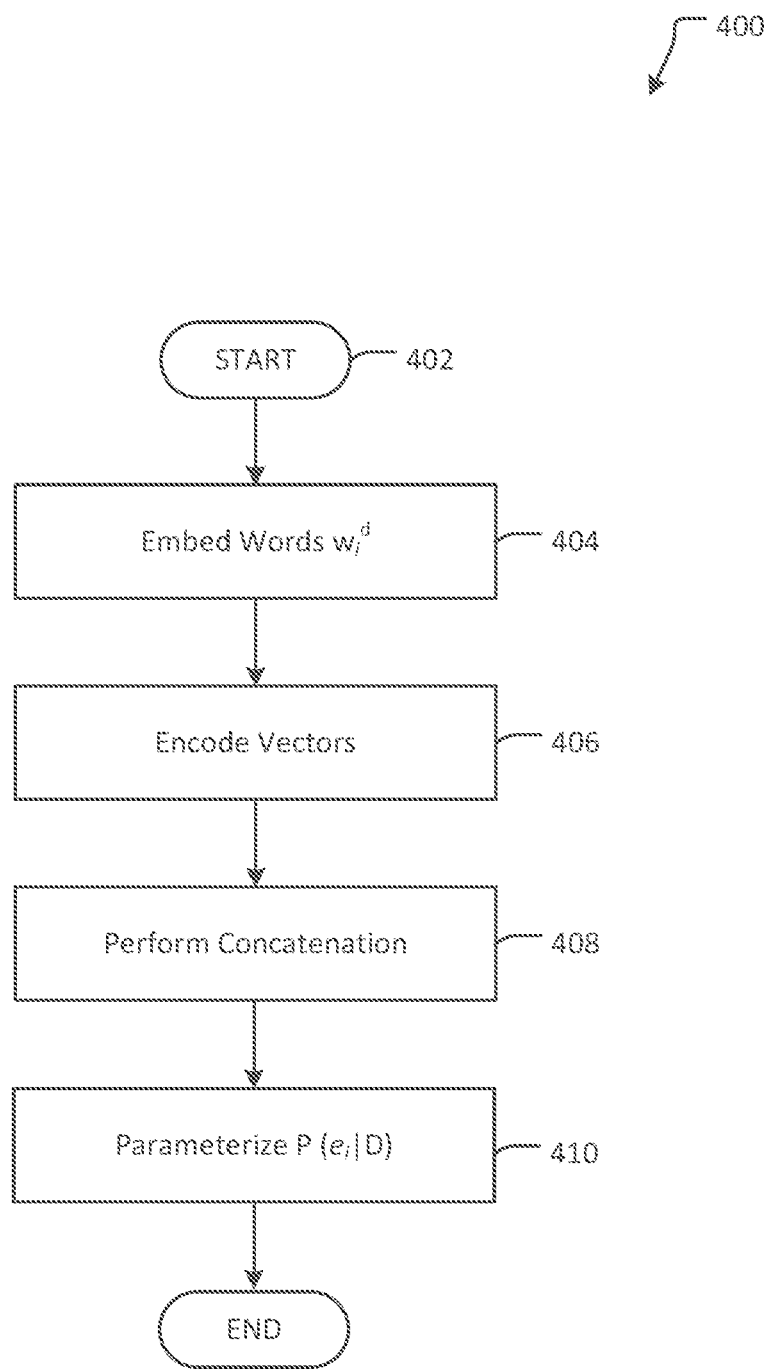
FIG. 4 illustrates a neural entity selection process, according to an example embodiment herein.

The model is then trained on the binary classification task of predicting whether an entity overlaps with any "gold answers" (i.e., answers from SQuAD). FIG. 4 shows an example flow diagram of a training method according to an example aspect herein. FIG. 6 shows an encoding layer 40 of a pointer network 600 (see also encoding layer 40 of FIG. 5). Referring to FIGS. 2, 4, and 6, the training method starts in 402 and then in procedure 404 each word $w_i^d$ is embedded in an embedding layer 18 using an embedding lookup table, to generate a corresponding distributed vector $V_i^{d\_emb\_w}$, such that, for a sequence of the words $w_1 \ldots w_n$, the embedding results in the generation of corresponding vectors $V_i^{d\_emb\_w} \ldots v_m^{d\_emb\_w}$ 43. As such, the sequence of the words $w_1 \ldots w_n$, is encoded into corresponding vectors $v_i^{d\_emb\_w} \ldots v_m^{d\_emb\_w}$ 43, A word embedding is a paramaterized function mapping words to high-dimensional vectors. For example:

W("Williams")=(0.1, −0.3, 0.6, . . . )
W("British")=(0.0, 0.5, −0.2, . . . ).

In one example embodiment, the lookup table is parameterized by a matrix, θ, with a row for each word: $W_θ(w_n)=θ_a$. W is initialized to have random vectors for each word. Also in one example embodiment herein, embedding (e.g., embedding layer 18 and procedure 404) can be performed in accordance with the embedding procedure described in reference [32] or [35].

The vectors $v_i^{d\_emb\_w} \ldots v_m^{d\_emb\_w}$ 43 are then encoded in procedure 406 using, for example, a bidirectional Long Short-Term Memory (BiLSTM) 20 to generate annotation vectors $h_1^d \ldots h_m^d$ 46. In one non-limiting example embodiment, the BiLSTM 20 operates according to any suitable BiLSTM technique, such as that described in any of the following publications: "Long short-term memory", *Neural Computation* 9(8), 1735-1780, 1997, by Sepp Hochreiter and Jurgen Schmidhuber (hereinafter "the Hochreiter et al. publication"), and "Framewise phoneme classification with bidirectional LSTM and other neural network architectures", Neural Networks, vol. 18, no. 5, pages 602 to 610 (publisher Elsevier 2005), by Alex Graves and Jurgen Schmidhuber (hereinafter "the Graves et al. publication"). The Hochreiter et al. publication and the Graves et al. publication are hereby each incorporated by reference herein in their entireties, as if set forth fully herein.

Figure 3:
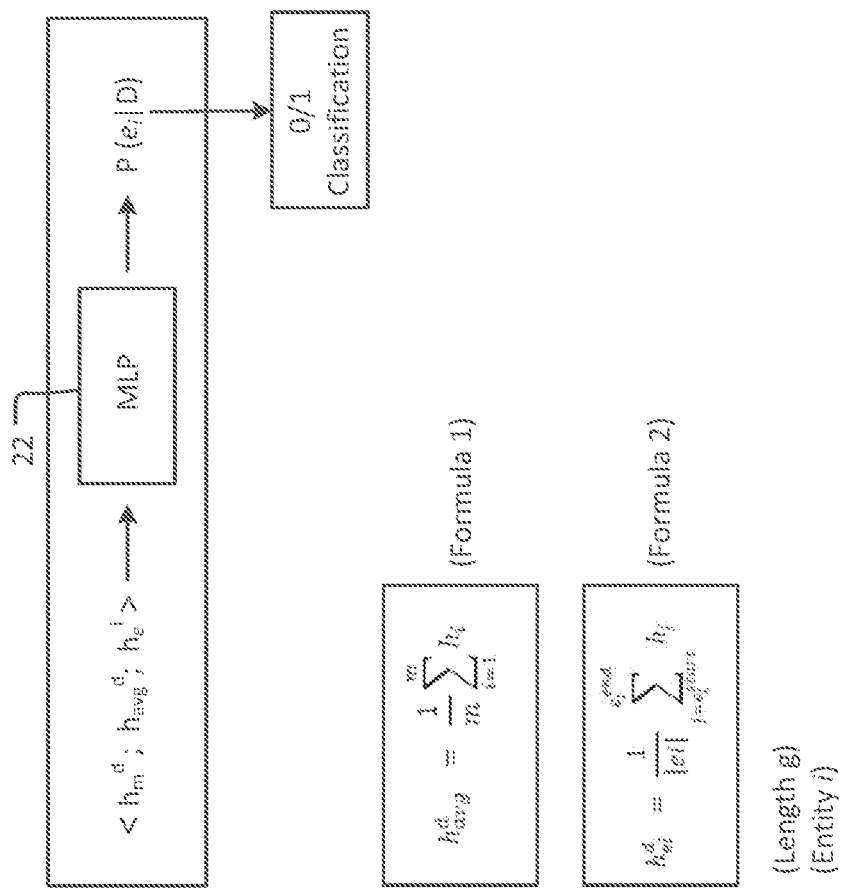

Referring to FIGS. 3 (representation 300) and 4 (process 400), based on the annotation vectors $h_1^d \ldots h_m^d$ 46, a concatenation of three vectors $<h_m^d; h_{avg}^d; h_{ei}>$ is generated in procedure 408, wherein $h_m^d$ is the final vector of the annotated vectors, $h_{avg}^d$ is an average of those annotation vectors, and $h_{ei}$ is the average of the annotation vectors corresponding to an i-th one of the entities 11. In one example, embodiment herein, $h_{avg}^d$ is calculated using formula F1 represented in FIG. 3, and $h_{ei}$ is calculated using formula F2 of FIG. 3.

Based on the concatenation of three vectors $<h_m^d; h_{avg}^d; h_{ei}>$, in procedure 410 a multilayer perceptron (MLP) 22 (e.g., a feed forward MLP) parameterizes $P(e_i|D)$ (i.e., maximizes $\Sigma_i^{n_e} \log(P(e_i|D))$, wherein $e_i$ represents the i-th entity, D represents the document, and $n_e$ represents the number of entities. The MLP 22 can be implemented using any suitable MLP known in the art, such as, for example, that described at http://www.deeplearningbook.org/contents/mlp.html, which is incorporated by reference herein.

The result outputted from MLP 22 is a value of $P(e_i|D)$ that represents a probability that a particular entity $e_i$ is relevant given the document D. In one example embodiment herein, the output is a binary "0" or "1" classification.

Pointer Networks

While a significant fraction of answers in SQuAD are entities, extracting interesting aspects of a document can require looking beyond entities. Many documents of interest may lack entities, or sometimes an entity tagger may fail to recognize some important entities. To remedy this, an example aspect of the present application provides a neural model trained from scratch to extract all answer key phrases in a particular document. This model is parameterized as a pointer network to point sequentially to start and end locations of all key phrase answers. As in the entity selection model, the given document is first encoded into a sequence of annotation vectors. A decoder LSTM is then trained to point to all of the start and end locations of answers in the document (e.g., from left to right) conditioned on the annotation vectors, via an attention mechanism. A special termination token can be provided in the document, for which the decoder is trained to attend on when it has generated all key phrases. This provides the flexibility to learn the number of key phrases the model should extract from a particular document. The pointer network parameterization is described in more detail as follows, according to one example embodiment of the present application.

Figure 5:
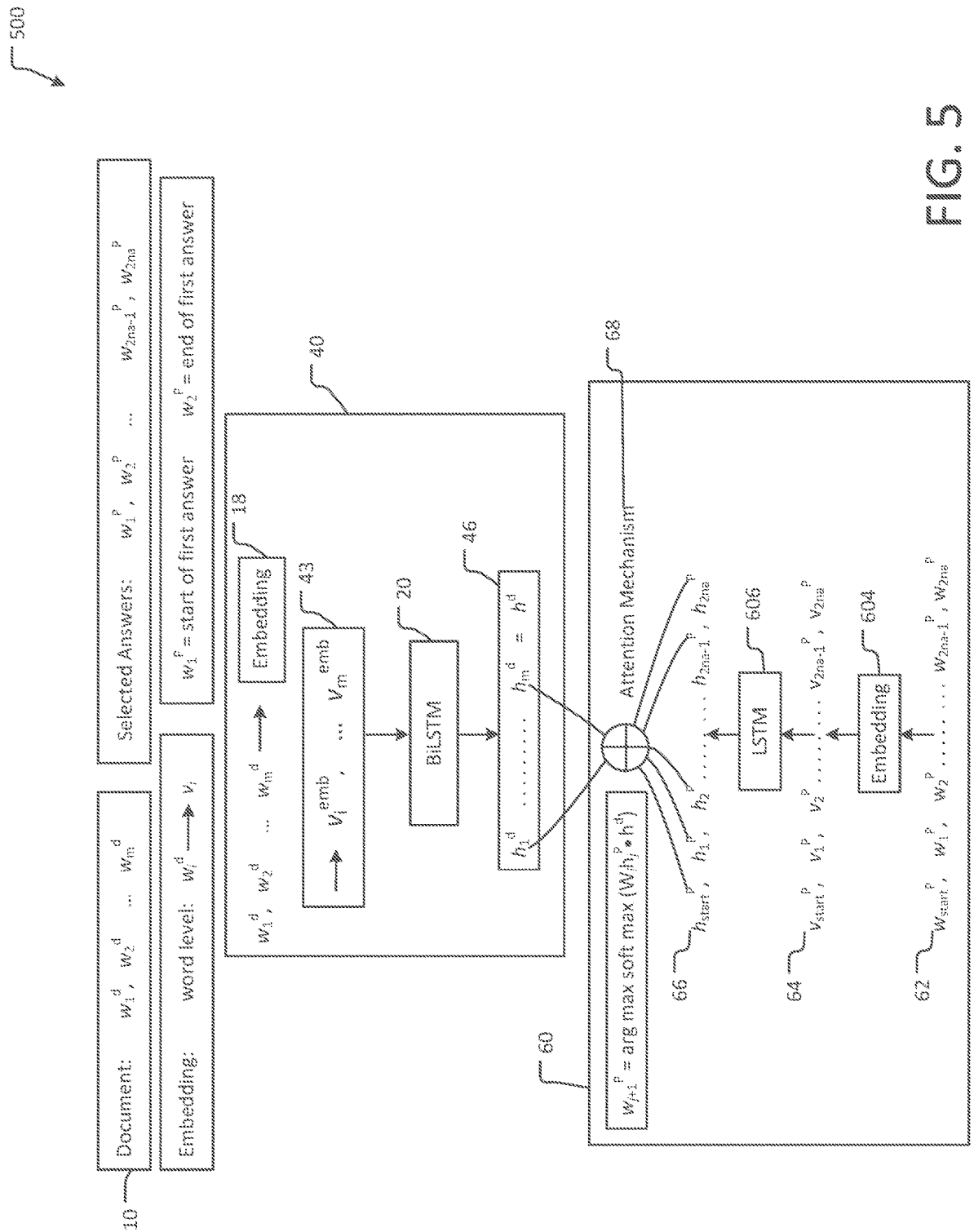
FIG. 5 shows a pointer network according to an example embodiment herein.
Figure 6:
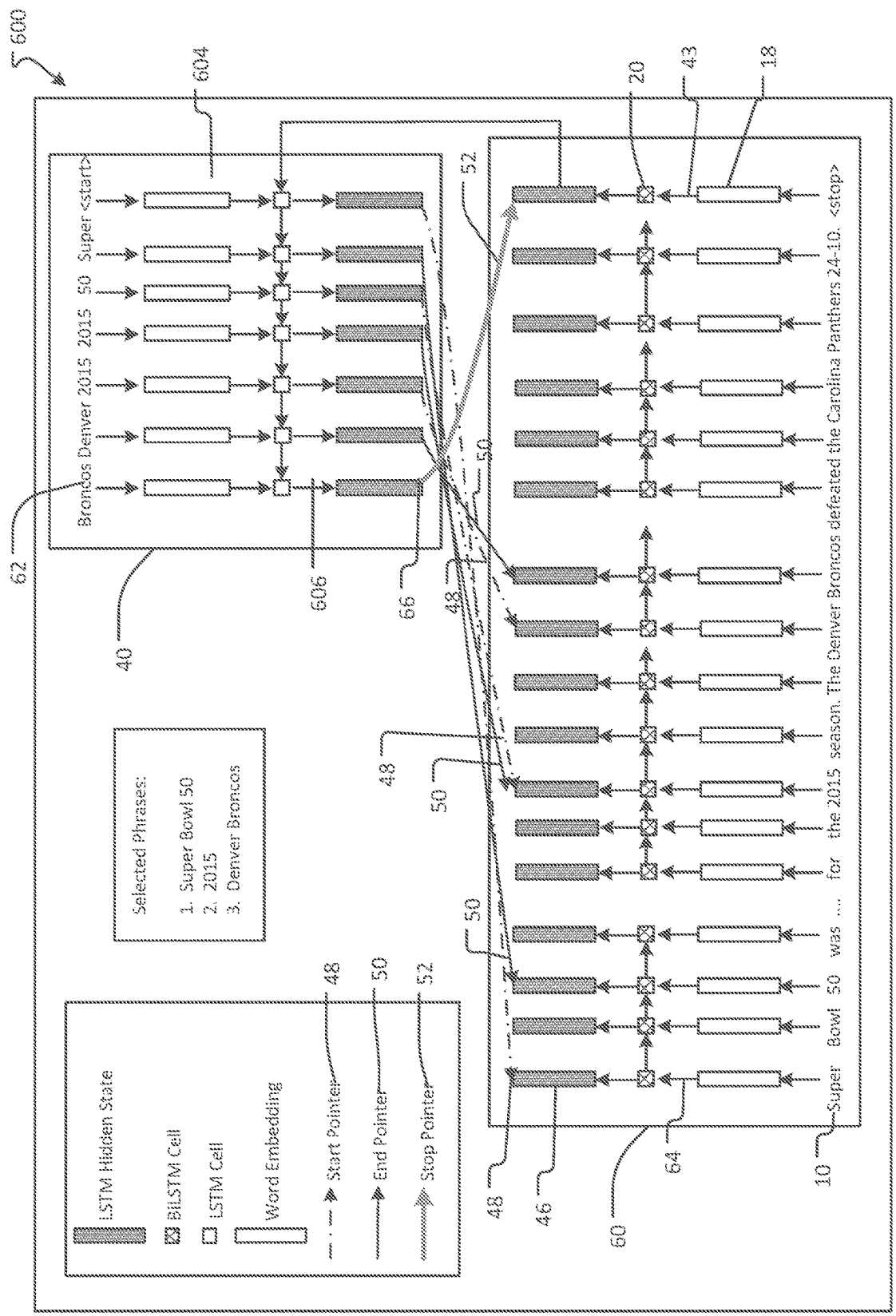
FIG. 6 shows another representation of a pointer network according to an example embodiment herein.

A pointer network according to an example embodiment herein will now be described, with reference to FIGS. 5 and 6, wherein FIG. 5 shows a representation 500 of the pointer network, and FIG. 6 shows a further representation 600 of the pointer network. FIG. 5 represents denotations of a sequence of words $w_1^d, w_2^d \ldots w_m^d$ of the document 10, which are provided as inputs to the pointer network, and also represents denotations of selected answers $w_1^P, w_2^P \ldots w_{2na-1}^P, w_{2na}^P$ that are outputted from the pointer network, wherein $w_1^P$ represents the start word of a first answer, and $w_2^P$ represents the end word of the first answer. FIG. 5 also represents designations indicating that word-level embedding of a word $w_i^d$ results in a corresponding vector $v_i^{d\_emb\_w}$.

Figure 7:
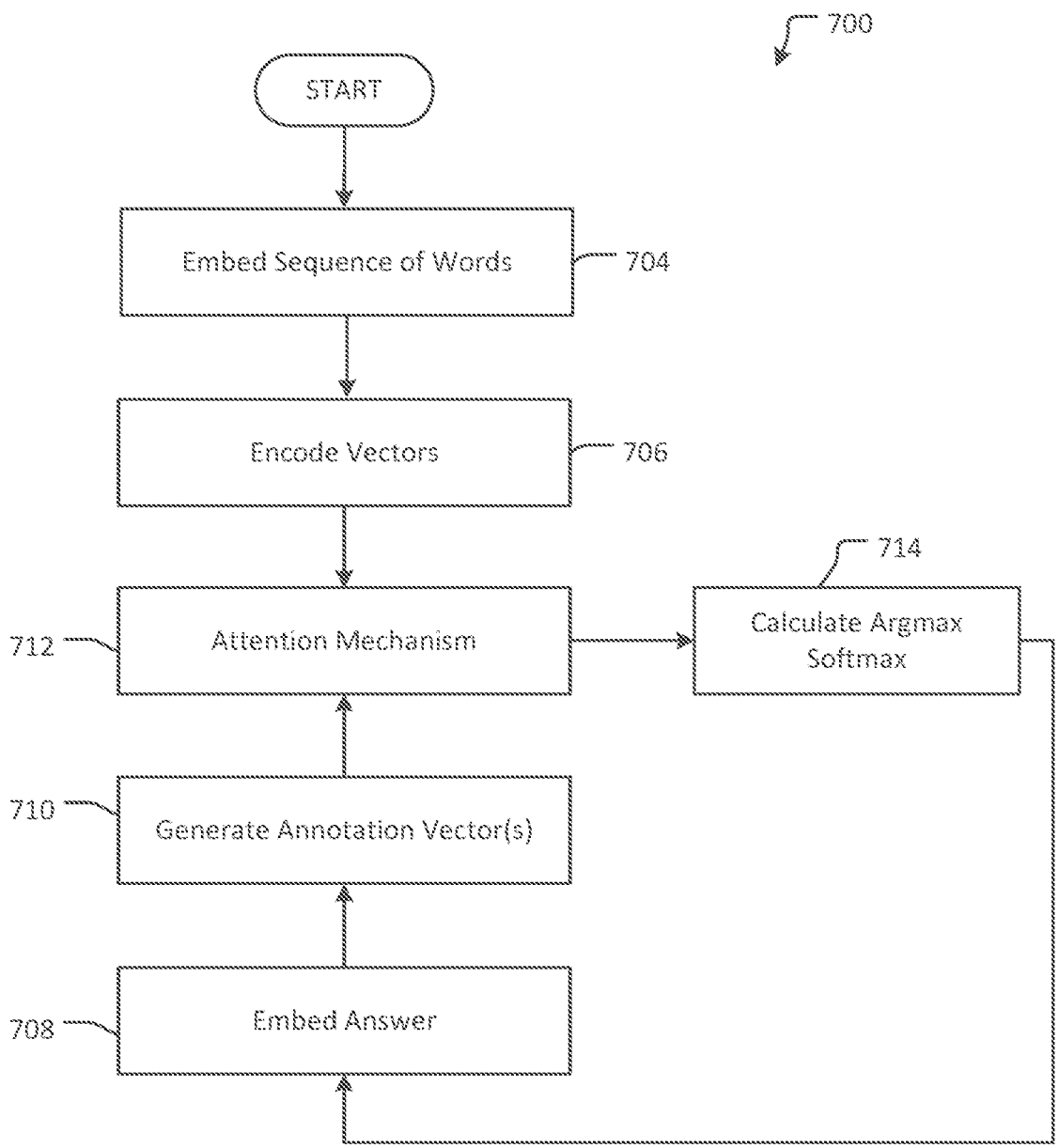
FIG. 7 illustrates a pointer network process according to an example embodiment herein.

In operation, and referring to FIGS. 5, the sequence of words from the document 10 is encoded by an encoding layer 40, according to the pointer network process 700 of FIG. 7. In the encoding, the words $w_1^d, w_2^d \ldots w_m^d$ are embedded in procedure 704 using, for example, an embedding layer 18 having an embedding lookup table, to generate corresponding vectors $v_1^{emb} \ldots v_m^{emb}$ 43. Those vectors 43 are then applied to a BiLSTM 20, which then encodes those vectors in procedure 706 to generate corresponding annotation vectors $h_1^d \ldots h_m^d$ 46.

Referring now to decoder 60 of FIGS. 5 and 6, that element will now be described in conjunction with the process 700 of FIG. 7. In procedure 708 an embedding layer 604 embeds answers $w_{start}^r, w_1^P, w_2^P \ldots w_{2na-1}^P, w_{2na}^P$ 62 one by one using, for example, an embedding lookup table, where na represents the number of answers (key phrase) The initial answer $w_{start}^r$ is the first one applied to the embedding layer 604, and subsequent answers $w_1^P, w_2^P \ldots w_{2na-1}^P, w_{2na}^P$ are applied iteratively to the layer 604 as each respective one is generated and output by the decoder 60 in the manner described below. Thus, the inputs at each step of the decoder 60 are words from the document that correspond to the start and end locations pointed to by the decoder 60. The embedding of respective one of the answers $w_{start}^P, w_1^P, w_2^P \ldots w_{2na-1}^P, w_{2na}^P$ results in the generation of corresponding ones of vectors $v_{start}^P, v_1^P, v_2^P \ldots v_{2na-1}^P, v_{2na}^P$ 64, each of which, upon being generated, is applied to LSTM 606. The LSTM 606 generates (in procedure 710) a corresponding annotation vector $h_{start}^P, h_1^P, h_2^P \ldots h_{2na-1}^P, h_{2na}^P$ 66, for each corresponding one of the annotation vectors $h_{start}^P, h_1^P, h_2^P \ldots h_{2na-1}^P, h_{2na}^P$, where $h_1^P, h_2^P$ represent start and end annotation vectors for a first answer, etc.

In one non-limiting example embodiment, embedding (e.g., embedding procedures 704, 708) can be performed in accordance with any suitable embedding procedure, such as that described in any of the following publications: "Distributed representations of words and phrases and their compositionality", Advances in neural information processing systems (2013), pages 3111 to 3119, by Tomas Mikolov et al. (hereinafter "the Mikolov publication"); and "A neural probabilistic language model", Journal of machine learning research (2003), volume 3, Feb., pages 1137 to 1155, by Yoshua Bengio et al. ("hereinafter, the Bengio publication"). Also in one non-limiting example embodiment, the BiLSTM 20 used in procedure 706 can operate according to any suitable BiLSTM technique, such as that described in the Hochreiter et al. or Graves et al. publication, and the LSTM 606 used in procedure 710 can operate according to any suitable LSTM technique, such as that described in the Hochreiter et al. publication. The Mikolov et al. and Bengio et al. publications are each hereby incorporated by reference herein in their entireties, as if set forth fully herein.

A dot product attention mechanism 68 for $(W_1 h_j^P * h^d)$ is then determined in procedure 712, where W1 is an affine transformation matrix, $h_j^P$ represents an answer annotation vector 66 from decoder 60 (i.e., from procedure 710) and $h^d$ represents an annotation vector 46 from encoder 40 (i.e., from procedure 706). In one example embodiment herein, the dot product attention mechanism is performed in accordance with that described in reference [21] by Luong et al.

A determination is then made in procedure 714 of a value of $W_{j+1}^P$, where $W_{j+1}^P$, is represented by formula F3 below:

$$W_{j+1}^P = \text{argmax softmax}(W_1 h_j^P * h^d) \quad (F3)$$

$W_{j+1}^P$ is a word with a maximum probability of being a start or end word of an answer. That word is then applied back to embedding layer 604 where the pointer network 600 then performs again in a similar manner as described above, but for that word (i.e., an answer word $w_1^P, w_2^P \ldots w_{2na-1}^P$, or $w_{2na}^P$) of decoder 60, and also based upon a next input word $w_1^d, w_2^d \ldots$, or $w_m^d$ to encoder 40.

A softmax function, or normalized exponential function, is a generalization of the logistic function logistic that. "squashes" a K-dimensional vector of arbitrary real values to a K-dimensional vector of real values in the range [0, 1] that add up to 1.

The dot product attention mechanism 68 effectively parameterizes a probability distribution $P(w_i^d = \text{start} | h_1^P \ldots h_j^P, h^d)$ and a probability distribution $P(w_i^d = \text{end} | h_1^P \ldots h_j^P, h^d)$ between the encoder 40 and decoder 60 annotation vectors 46, 66, wherein those distributions represent, for example, the probability of a particular word of the document being a starting word (in the case of the former distribution) and an ending word (in the case of the latter distribution). The above formula F3 also can be expressed in another form as formula F4 below:

$$P(\omega_i^d | h_1^P \ldots h_j^P, h^d) = \text{softmax}(W_1 h_j^P \cdot h^d) \quad (F4)$$

FIG. 6 also represents start pointers 48, end pointers 50, and a stop pointer 52. As can be appreciated in view of FIGS. 5-7 and the above description, the word "Super" is the first word of the phrase "Super Bowl 50" (see pointer 48), and the word "50" is the last word of that phrase (see pointer 50). The word "2015" is the first and last word of another phrase (and is pointed to by both pointers 48, 50), "Denver" is the first word of a further phrase "Denver Broncos" (and is pointed to by pointer 48), and "Broncos" is the last word of that phrase (and is pointed to by pointer 50). Stop pointer 52 points to a <stop> word. Accordingly, in the present example, those phrases are identified and extracted as answer key phrases from the document by the pointer network 600, by virtue of the network 600 pointing sequentially to the start and end locations of the answer key phrases.

According to an example embodiment herein, during inference, selection can be made of the top k entities with highest likelihood as being relevant in the document given by the model, where, in one example embodiment, k=6 as determined by a hyper-parameter search. During inference, a greedy decoding strategy is employed according to an example embodiment herein, to greedily pick the best location from the softmax vector at every step and post process results to remove duplicate key phrases. The word input to the decoder 60 at each iteration can correspond to the start or end locations pointed to by the decoder 60.

Question Generation

A question generation model according to an example aspect of the present application will now be described. The model takes a document $D = (w_1^d \ldots w_{n_d}^d)$ 10 and an answer $A = (w_1^\alpha \ldots w_{n_\alpha}^\alpha)$ 12 as inputs, and outputs a question $Q = (\hat{w}_1^q, \ldots, \hat{w}_{n_q}^q)$. Referring to representation 900 of FIG. 9, document (D) 10 and an answer (A) (or key phrase) 12 are further represented with different designations. Document 10 includes words $w_1 \ldots w_m$ (where m represented the number of words in the document), and an answer (A) is a sub-set 14 of n words of the document 10, including words $w_{i+1} \ldots w_{i+n}$ (where i and n are integers). Document 10 and answer 12 form input sequences 16 for an embedding layer 18, as described below in the context of FIG. 8a. Each answer or key phrase was generated by the pointer network 600 in the manner described above, and is deemed as being the best answer or key phrase based on the probability determinations by the pointer network 600.

Figure 10A:
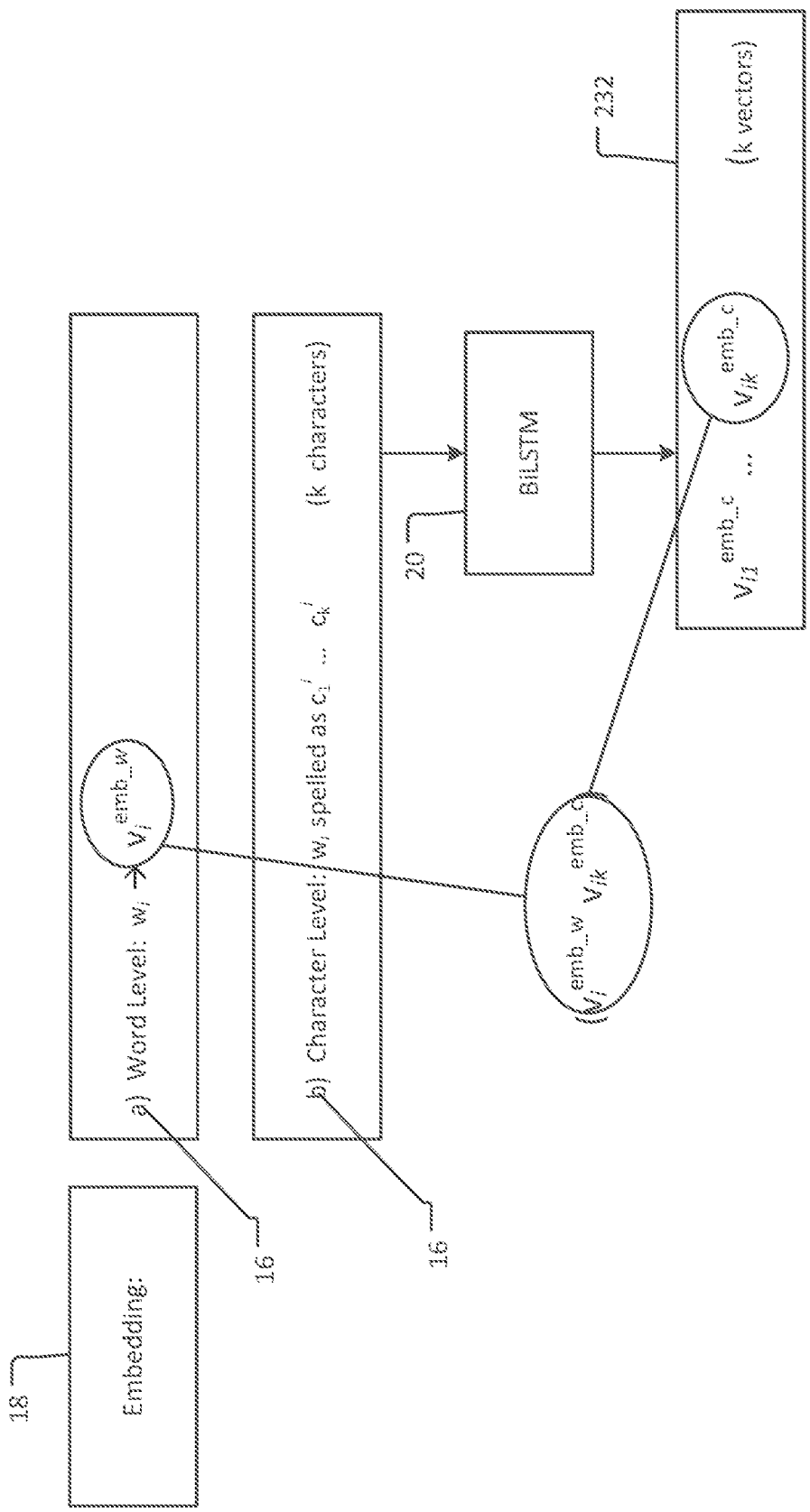

In the embedding layer 18 (FIG. 10a), embedding is performed to the input sequences 16 by performing concatenation at both word- and character-level embeddings $e_1 = (e_i^w; e_i^{ch})$. For example, and referring also to the process of FIG. 8a, word-level embeddings are performed in procedure 802 and result in a vector being generated for each respective input word, such that embedding of word $w_i$ results in an embedded word vector $v_i^{emb\_w}$. In procedure 804, character-level embeddings are performed, in which k characters $c_1^i \ldots c_k^i$ of a respective word are applied to a BiLSTM 20 which produces k vectors, such as embedded character vectors $v_{i1}^{emb\_c} \ldots v_{ik}^{emb\_c}$. As such, for a word- and character embedding of a word $w_i$, embedding layer 18 outputs a vector $<v_v^{emb\_w}, v_{ik}^{emb\_c}>$, where $v_{ik}^{emb\_c}$ is the final vector for the character-level embedding of the word $w_i$.

Figure 8A:
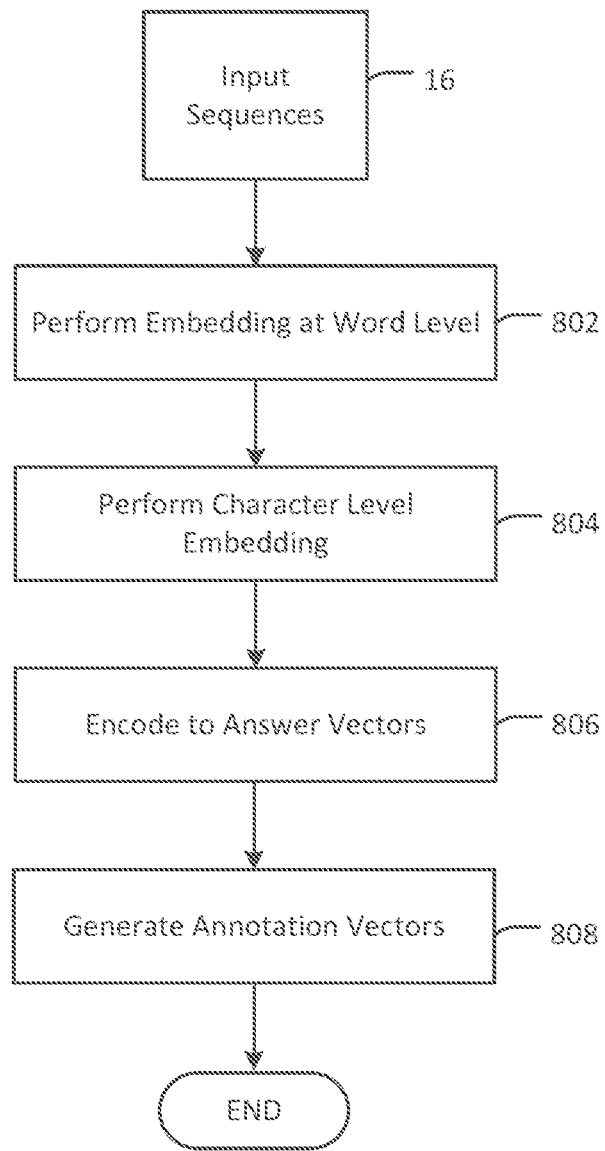
FIGS. 8A and 8B illustrate a question generation process according to an example embodiment herein, including an encoder process (FIG. 8A) and a decoder process (Figure B).
Figure 9:
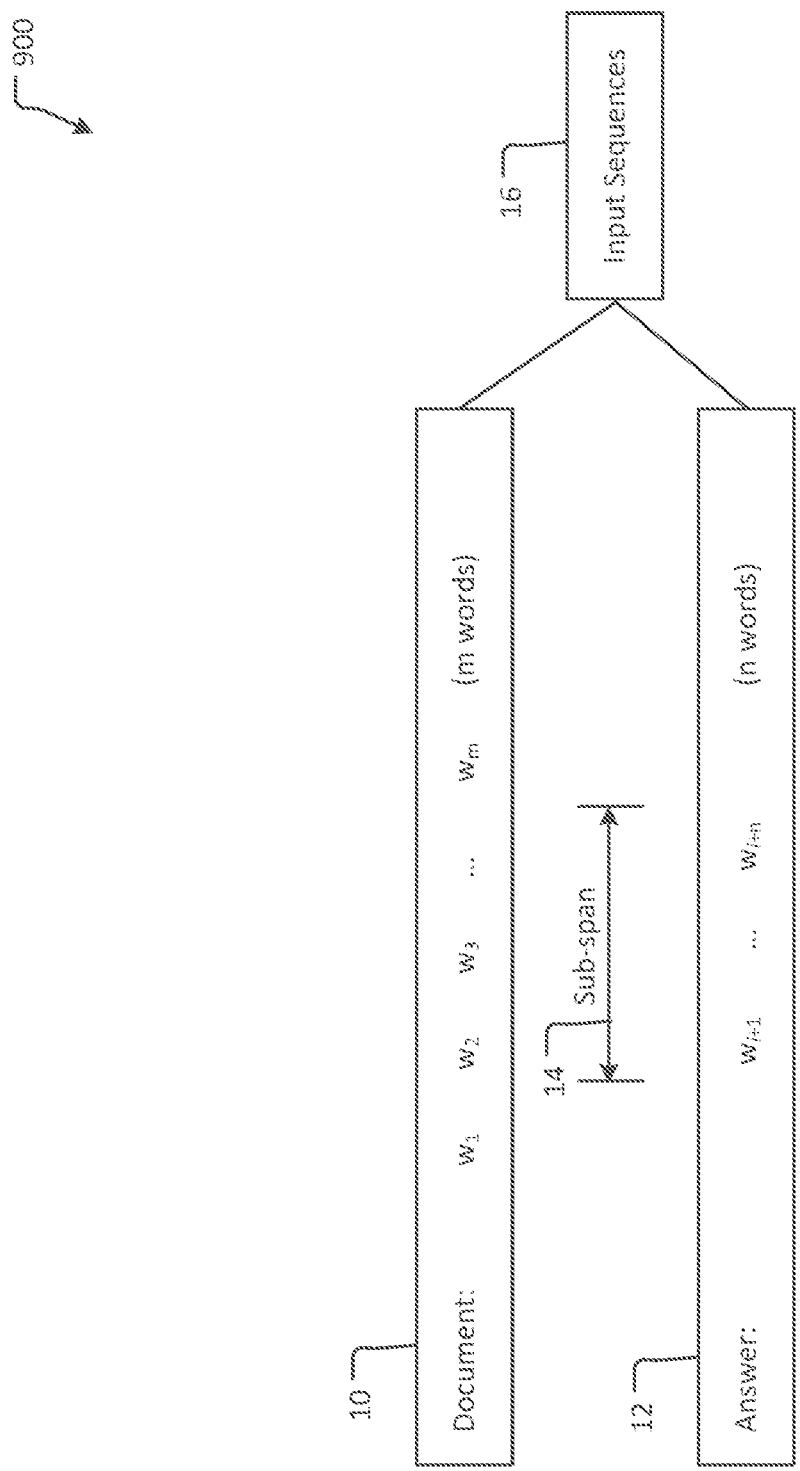
Figure 10B:
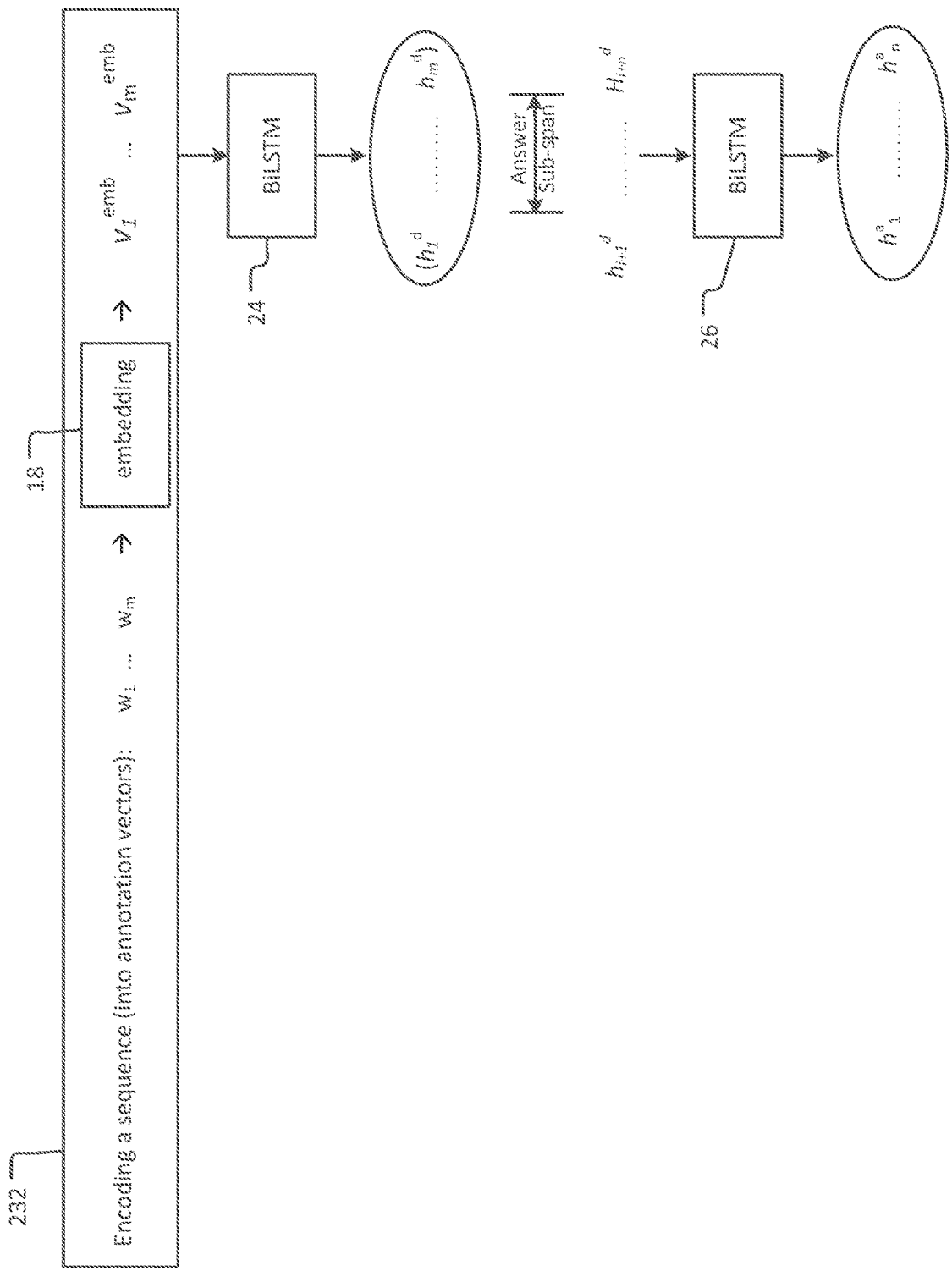

Referring to FIG. 10b in conjunction with FIG. 8a, an encoding layer 232 procedure will now be described. The encoding layer 232 encodes concatenated embeddings into annotation vectors. FIG. 10b further represents the words $w_1 \ldots w_m$ of the document 10 and the word-level embeddings thereof by embedding layer 18 to produce embedded word vectors $v_1^{emb} \ldots v_m^{emb}$, as described above. In procedure 806 those vectors $v_1^{emb} \ldots v_m^{emb}$ are applied to a BiLSTM 24 which encodes them into annotation vectors $h_1^d \ldots h_m^d$, wherein a subset 26 of those annotation vectors forms answer vectors $h_{i+1}^d \ldots h_{i+n}^d$.

In one example embodiment herein, the answer vectors $h_{i+1}^d \ldots h_{i+n}^d$ are extracted at answer word positions $E = ((e_1^{start}, e_1^{end}), \ldots, (e_{n_e}^{start}, e_{n_e}^{end}))$ of answers. For example, the extracting can include indexing of the embedded word vectors $v_1^{emb} \ldots v_m^{emb}$ to the positions E.

In procedure 808, the answer vectors $h_{i+1}^d \ldots h_{i+n}^d$ are applied to another BiLSTM 28 which then generates corresponding annotation vectors $h_1^a \ldots h_n^a$.

Figure 8B:
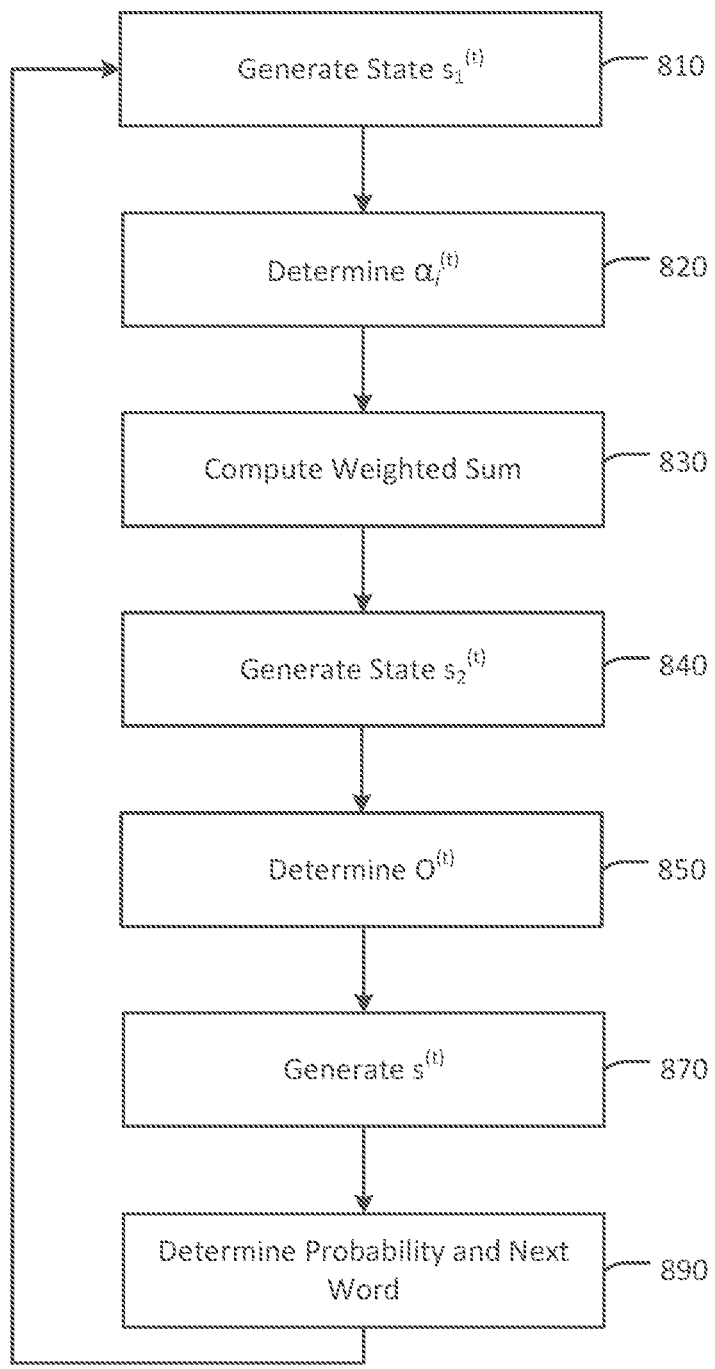
Figure 11:
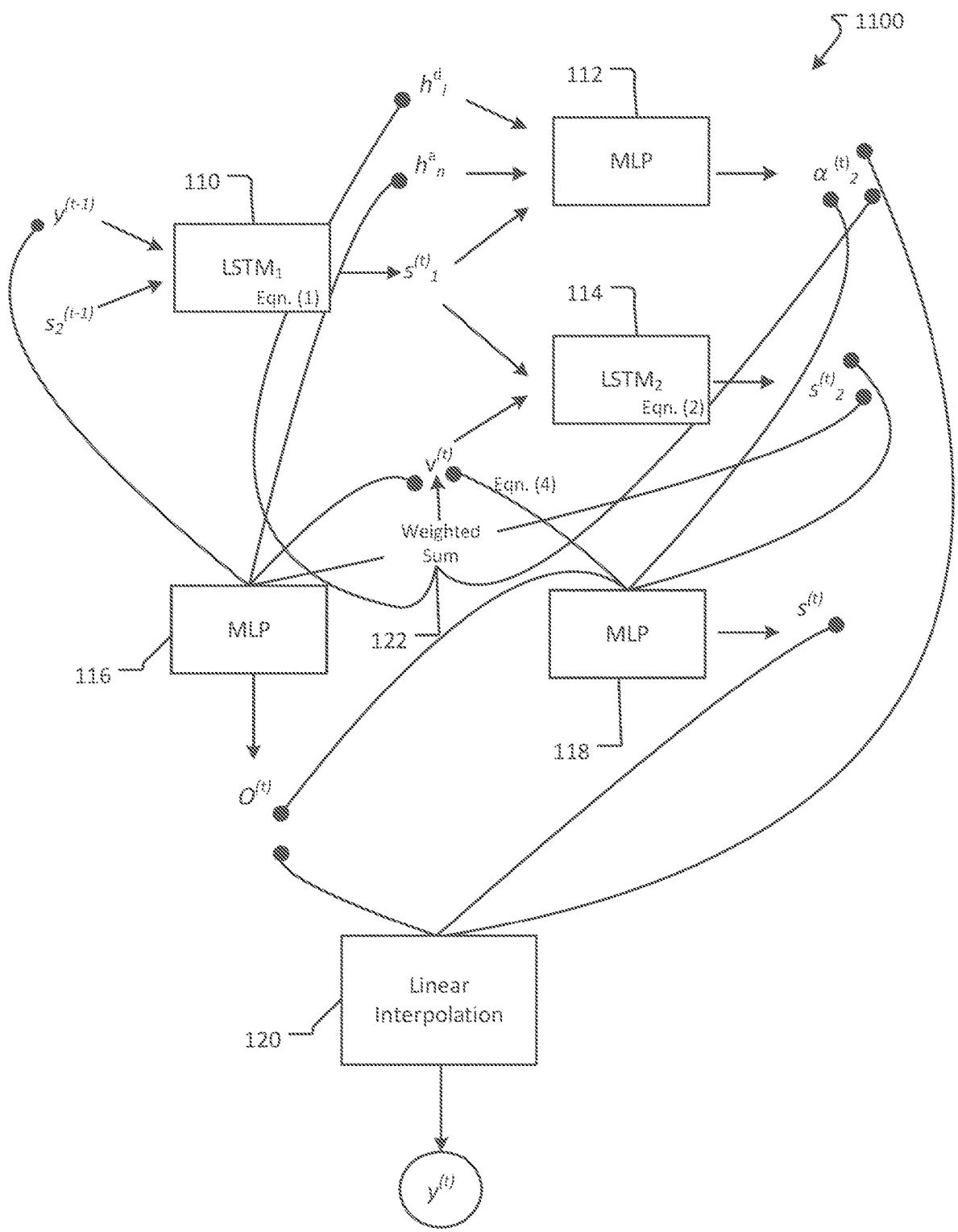

Referring now to FIG. 11, a decoder 1100 (e.g., a recurrent neural network decoder) of the question generating model will now be described, in conjunction with FIG. 8b, which depicts a decoding process according to an example aspect of the present application. In procedure 810 an immediately previous word $y^{(t-1)}$ (i.e., a word previous to a current one of the document) and a previous state $s^{(t-1)}$ (i.e., a state corresponding to the previous word) are provided to a LSTM1 10, which operates according to the below equation (1) to determine and output a state $s_1^{(t)}$ $$s_1^{(t)} = c_1(y^{(t-1)}, s_2^{(t-1)}) \quad (1)$$

$$s_2^{(t)} = c_2(v^{(t)}, s_1^{(t)}), \quad (2)$$

(It should be noted that in the case where there is no previous word $y^{(t-1)}$ or previous state $s^{(t-1)}$, such as for a case at the beginning of the document, the information applied to the LSTM1 10 in procedure 810 is predetermined information that can be understood and acted upon by the LSTM1 10 to enable it to perform equation (1)). Variable t represents a step or iteration of the decoder 1100.

In procedure 820, the state $s_1^{(t)}$, an annotation vector $h_i^d$ for an $i^{th}$ word (obtained in procedure 806), and an annotation vector $h_n^a$ for an answer (e.g., a last one n for an answer sequence) (obtained in procedure 808), are applied to a MLP 112 that operates according to the below equation (3) to generate a resulting output, wherein each such output is per the corresponding $i^{th}$ word of the document obtained at each iteration (t) of the decoder 1100.

$$\alpha_i^{(t)} = f(h_i^d, h^a, s_1^{(t-1)}), \tag{3}$$

The result of equation (3) represents an "attention" distribution (i.e., a document attention) indicating what was paid attention to (i.e., as in a "heat map"). Also, in equation (3) the term "f", according to one example embodiment herein, represents a two-layer MLP with tanh and softmax activation, respectively.

In procedure 830, a weighted sum 122 in the form of a context vector $V^{(t)}$ is obtained based on the output of MLP 112 and the annotation vector $h_i^d$ for the $i^{th}$ word, based on the equation (4) below:

$$v^{(t)} = \sum_{i=1}^{n} \alpha_j^{(t)} h_i^d. \tag{4}$$

The weighted sum vector $V^{(t)}$ represents what was attended to by the decoder 1100, and the weighted average at the iteration t of all vectors in the document.

In procedure 840, the vector $V^{(t)}$ and the state $s_1^{(t)}$ are applied to a LSTM2 114 which operates according to equation (2) above to generate a state $s_2^{(t)}$ (i.e., a switch scalar at step (t)).

Referring now to MLP 116, in procedure 850 the MLP 116 receives inputs that include word $y^{(t-1)}$, an annotation vector $h_n^a$, weighted sum $V^{(t)}$, and state $s_2^{(t)}$, and operates according to equation (5) below to determine a vocabulary word to generate:

$$o^{(t)} = g(y^{(t-1)}, s_2^{(t)}, v^{(t)}, h^a). \tag{5}$$

The result of equation (5) defines a distribution over a prescribed decoder vocabulary with, for example, a two-layer MLP, and can indicate a word to be generated. Referring now to MLP 118, in procedure 870 that MLP 118 receives as inputs the output $o^{(t)}$ of the MLP 16, weighted sum $V^{(t)}$, state $s_2^{(t)}$, and the output of MLP 112, and operates according to equation (6) to generate a state $s^{(t)}$:

$$s^{(t)} = h(s_2^{(t)}, v^{(t)}, \alpha^{(t)}, o^{(t)}). \tag{6}$$

The state $s^{(t)}$ is a switch scalar s(t) (pointer softmax) at each time step (t) and determines whether to generate a new word or copy a word to employ from the document. According to an example embodiment herein, the first two layers of h use tanh activation and the final layer uses sigmoid. Highway connections are present between the first and the second layer. Also in one example embodiment herein, entropy of the softmax distributions to the input of the final layer is attached, as this can guide a switching mechanism by indicating a confidence of pointing versus generating. The addition improves model performance.

Next, in procedure 890 the resulting switch is used to interpolate the pointing and the generative probabilities for predicting the next word, based on equation (7):

$$P(\hat{\omega}_t) \sim s^{(t)} \alpha^{(t)} + (1 - s^{(t)}) o^{(t)}. \tag{7}$$

In equation (7), $P(w_t)$ represents the probability of which word is a next word in a question being formed. More particularly, in procedure 890 the outputs of the MLPs 116 and 118 are provided to a linear interpolator 120 which operates based on equation (7) to identify a word output $y^{(t)}$ having a greatest probability of being a next word in a question.

The process then returns to procedure 810 and then repeats based on the word determined in procedure 890, where determined word $y^{(t)}$ is now used for term $y^{(t-1)}$ in the next iteration of the procedure, to determine a next word in the question in the next performance of procedure 890. The result of the iterative process is a sequence of words that form the question, wherein each word is generated from vocabulary or copied from the document. The start and end of the determined question can be determined based on the results of the pointer network 600.

As can be appreciated in view of the above description, the decoder 1100 operates as a recurrent neural network-based decoder employing a pointer-softmax mechanism. At each generation step, the decoder 1100 decides adaptively whether (a) to generate from a decoder vocabulary or (b) to point to a word in the source sequence (and copy over).

It is noted that, in the above question generation model, in one non-limiting example embodiment, embedding 18 (FIG. 10) can be performed in accordance with any suitable embedding procedure such as that described in, for example, the Mikolov et al. or Bengio et al. publications, the BiLSTMs 20, 24, and 26 can operate according to any suitable BiLSTM technique, such as that described in, for example, the Hochreiter et al. or Graves et al. publications, and the LSTM1 110 and LSTM2 114 606 can operate according to any suitable LSTM technique, such as that described in, for example, the Hochreiter et al. publication. Moreover, according to an example embodiment herein, the MLPs 116 and 118 can be implemented as feed forward neural networks, using any suitable MLP technique known in the art, such as, for example, that described at http://www.deeplearningbook.org/contents/mlp.html.

Experiments

Dataset

An experiment conducted on a SQuAD corpus involved a machine comprehension dataset consisting of over 100 k crowdsourced question-answer pairs on 536 Wikipedia articles. Simple preprocessing was performed, including lower-casing and word tokenization using NLTK. The test split of SQuAD was hidden from the public. An amount of 5,158 question-answer pairs (self-contained in 23 Wikipedia articles) from the training set was used as a validation set.

All models were trained using stochastic gradient descent with a minibatch size of 32 using the ADAM optimization algorithm.

Key phrase detection models employed pretrained word embeddings of 300 dimensions, generated using a word2vec extension trained on the English Gigaword 5 corpus. Bidirectional LSTMs of 256 dimensions (128 forward and backward) were employed to encode the document and an LSTM of 256 dimensions as a decoder in the pointer network model.

A dropout of 0.5 was used at the outputs of every layer in the network. A beam search decode strategy also was employed with a beam size of 5 in the pointer network approach but no significant improvements were observed over greedy decoding, possibly because of short sequence lengths in the pointer network decoder.

In question generation, the decoder vocabulary used the top 2000 words sorted by their frequency in the gold questions in the training data. The word embedding matrix was initialized with the 300-dimensional GloVe vectors. The dimensionality of the character representations was 32. The number of hidden units was 384 for both of the encoder/decoder RNN cells. Dropout was applied at a rate of 0.3 to all embedding layers as well as between the hidden states in the encoder/decoder RNNs across time steps.

Qualitative examples of detected key phrases and generated questions, for Pointer Network (PtrNet) models versus other models, are represented in the Table immediately below.

TABLE 2

Qualitative examples of detected key phrases and generated questions.

| | | |
|---|---|---|
| Doc. | inflammation is one of the first responses of the immune system to infection. the symptoms of inflammation are redness, swelling, heat, and pain, . . . inflammation is produced by eicosanoids and cytokines, . . . and leukotrienes that attract certain white blood cells (leukocytes). . . . and interferons that have anti-viral effects, such as . . . | |
| | Entity-based Models | PtrNet |
| Q-A | first - is inflammation a part of the responses of the immune system to infection? one - how many responses of the immune system are there? | leukotrienes - what can attract certain white blood cells? eicosanoids and cytokines - what are bacteria produced by? anti-viral effects - what type of effects do interferons have? |
| Doc. | research shows that student motivation and attitudes towards school are closely linked to student-teacher relationships. enthusiastic teachers are particularly good at creating beneficial relations with their students. . . . useful teacher-to-student interactions are crucial in linking academic success with personal achievement. . . . a teacher must guide his student in aligning his personal goals with his academic goals. . . . | |
| | PtrNet (Entity-based models fail to generate any answer) | |
| Q-A | student-teacher relationships - what are the student motivation and attitudes towards school closely linked to? teacher-to-student interactions - what is crucial in linking academic success with personal achievement? | enthusiastic teachers - who are particularly good at creating beneficial relations with their students? a teacher - who must guide his student in aligning his personal goals? |

Quantitative Evaluation

Since each key phrase is itself a multi-word unit, a naive word-level F1 score is unsuitable for evaluation due to the variable lengths of the key phrases. A new metric is thus employed called hierarchical F1, which is invariant to target length, by incorporating a notion of alignment between the gold and predicted phrases.

The metric is calculated as follows. Given the prediction sequence $\hat{e}_i$ and the gold label sequence $\hat{e}_j$, first there is constructed a pairwise, token-level F1 score $f_{i,j}$ matrix between the two phrases $\hat{e}_i$ and $\hat{e}_j$. Max-pooling along the gold-label axis essentially assesses the precision of each prediction, with partial matches accounted for by the pairwise F1 (identical to evaluation of a single answer in SQuAD) in the cells: $p_i = \max_j(f_{i,j})$. Analogously, recall for label $e_j$ can be defined by max-pooling along the prediction axis: $r_j = \max_i(f_{i,j})$. The hierarchical F1 is defined by the mean precision $\bar{p} = \text{avg}(p_i)$ and recall $\bar{r} = \text{avg}(r_j)$;

$$F1_H = \frac{2\bar{p} \cdot \bar{r}}{(\bar{p} + \bar{r})}.$$

Invariance to sample length is achieved by having equal weight for the overlap between the aligned phrases regardless of their lengths.

Results and Discussions

Evaluation results are listed in the Table immediately below, which represents evaluation results for Pointer Network (PtrNet) models versus other models.

TABLE 1

Model evaluation on question- and answer-generation.

| | Validation | | | Test | | |
|---|---|---|---|---|---|---|
| Models | $F1_H$ | Prec. | Rec. | $F1_H$ | Prec. | Rec. |
| ENT | 0.308 | 0.249 | 0.523 | 0.347 | 0.295 | 0.547 |
| NES | 0.334 | 0.335 | 0.354 | 0.362 | 0.375 | 0.380 |
| PtrNet | 0.352 | 0.387 | 0.337 | 0.404 | 0.448 | 0.387 |

As expected, the entity tagging baseline achieved best recall, likely by over-generating candidate answers. The NES model, on the other hand, exhibited precision and consequently outperformed the entity tagging baseline by notable margins in F1. This trend persisted in the comparison between the NES model and the pointer-network model.

Qualitatively, it is observed that the entity-based models have a strong bias toward numeric types, which often fail to capture interesting information in an article. In the first Table shown above for example, in the upper example, the entity baselines are only able to tag first and one, missing all of the key phrases that are successfully detected by the pointer model.

In addition, the entity-based systems tend to select the central topical entity as the answer, which can contradict the distribution of interesting answers selected by humans. For example, given a Wikipedia article on Kenya and the fact agriculture is the second largest contributor to Kenya's gross domestic product (gdp), the entity-based systems propose Kenya as a key phrase and asked what country is nigeria's second largest contributor to? (since the answer word kenya cannot appear in the output, the decoder produced a similar word Nigeria instead). Given the same information, the pointer model picked agriculture as the answer and asked what is the second largest contributor to kenya's gross domestic product?

FIGS. 12-15 and the associated descriptions provide a discussion of a variety of operating environments in which aspects of the disclosure may be practiced. However, the devices and systems illustrated and discussed with respect to FIGS. 12-15 are for purposes of example and illustration and are not limiting of a vast number of computing device configurations that may be utilized for practicing aspects of the disclosure, described herein.

Figure 12:
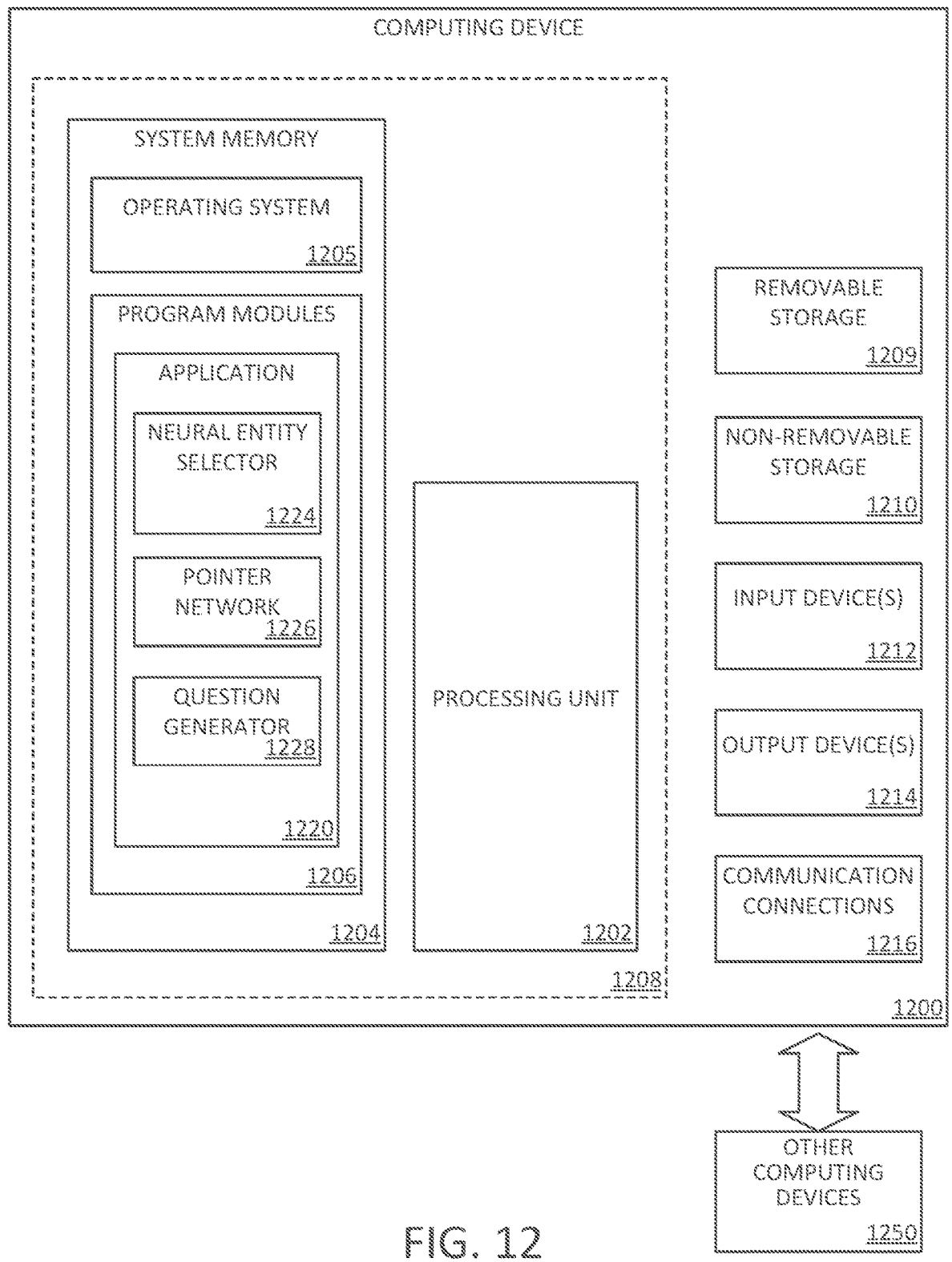
FIG. 12 is a block diagram illustrating example physical components of a computing device with which aspects of the disclosure may be practiced.

FIG. 12 is a block diagram illustrating physical components (e.g., hardware) of a computing device 1200 with which aspects of the disclosure may be practiced. The computing device components described below may be suitable for the computing devices described above, such as smart phones, tablets, HMDs, laptops, desktops, or other computing devices. In a basic configuration, the computing device 1200 may include at least one processing unit 1202 and a system memory 1204. Depending on the configuration and type of computing device, the system memory 1204 may comprise, but is not limited to, volatile storage (e.g., random access memory), non-volatile storage (e.g., read-only memory), flash memory, or any combination of such memories.

The system memory 1204 may include an operating system 1205 and one or more program modules 1206 suitable for running software application 1220, such as one or more components supported by the systems described herein. As examples, system memory 1204 may store instructions enabling the device 1200 to implement the processes described herein and shown in FIGS. 4, 7, 8a, and 8b. The operating system 1205, for example, may be suitable for controlling the operation of the computing device 1200.

Furthermore, embodiments of the disclosure may be practiced in conjunction with a graphics library, other operating systems, or any other application program and is not limited to any particular application or system. This basic configuration is illustrated in FIG. 12 by those components within a dashed line 1208. The computing device 1200 may have additional features or functionality. For example, the computing device 1200 may also include additional data storage devices (removable and/or non-removable) such as, for example, magnetic disks, optical disks, or tape. Such additional storage is illustrated in FIG. 12 by a removable storage device 1209 and a non-removable storage device 1210.

As stated above, a number of program modules and data files may be stored in the system memory 1204. While executing on the processing unit 1202, the program modules 1206 (e.g., application 1220) may perform processes including, but not limited to, the aspects, as described herein. Other program modules that may be used in accordance with aspects of the present disclosure may include a neural entity selector 1224, a pointer network 1226, a question generator 1228, electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 12 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 1200 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 1200 may also have one or more input device(s) 1212 such as a keyboard, a mouse, a pen, a sound or voice input device, a touch or swipe input device, handheld gaming controller, etc. The output device(s) 1214 such as a display, speakers, a printer, etc. may also be included. The aforementioned devices are examples and others may be used. The computing device 1200 may include one or more communication connections 1216 allowing communications with other computing devices 1250. Examples of suitable communication connections 1216 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1204, the removable storage device 1209, and the non-removable storage device 1210 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1200. Any such computer storage media may be part of the computing device 1200. Computer storage media is not a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 13A:
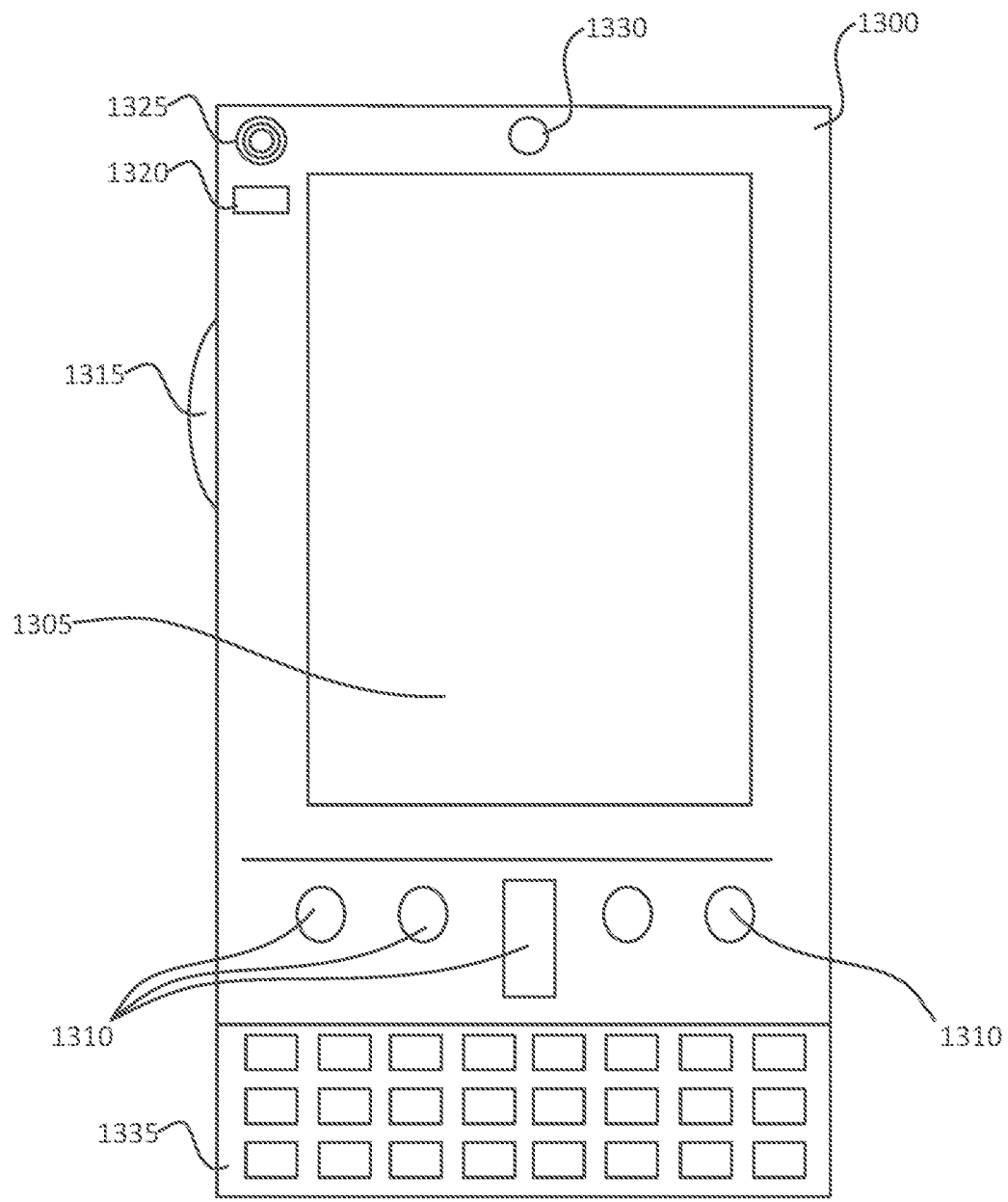
FIGS. 13A and 13B are simplified block diagrams of a mobile computing device with which aspects of the present disclosure may be practiced.
Figure 13B:
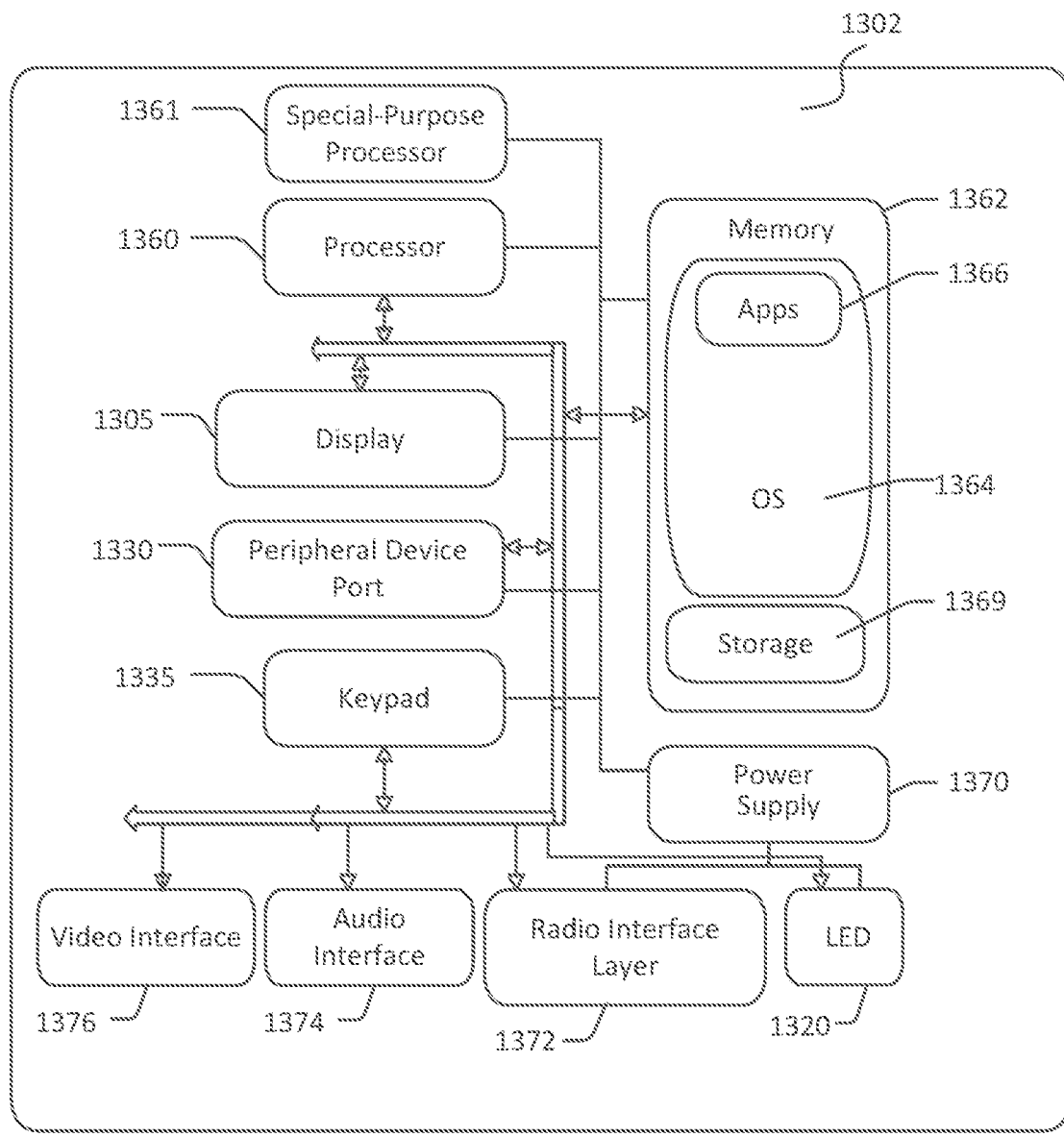

FIGS. 13A and 13B illustrate a mobile computing device 1300, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 13A, one aspect of a mobile computing device 1300 for implementing the aspects is illustrated. In a basic configuration, the mobile computing device 1300 is a handheld computer having both input elements and output elements. The mobile computing device 1300 typically includes a display 1305 and one or more input buttons 1310 that allow the user to enter information into the mobile computing device 1300. The display 1305 of the mobile computing device 1300 may also function as an input device (e.g., a touch screen display).

If included, an optional side input element 1315 allows further user input. The side input element 1315 may be a rotary switch, a button, or any other type of manual input element. In alternative aspects, mobile computing device 1300 may incorporate more or less input elements. For example, the display 1305 may not be a touch screen in some embodiments.

In yet another alternative embodiment, the mobile computing device 1300 is a portable phone system, such as a cellular phone. The mobile computing device 1300 may also include an optional keypad 1335. Optional keypad 1335 may be a physical keypad or a "soft" keypad generated on the touch screen display.

In various embodiments, the output elements include the display 1305 for showing a graphical user interface (GUI), a visual indicator 1320 (e.g., a light emitting diode), and/or an audio transducer 1325 (e.g., a speaker). In some aspects, the mobile computing device 1300 incorporates a vibration transducer for providing the user with tactile feedback. In yet another aspect, the mobile computing device 1300 incorporates input and/or output ports, such as an audio input (e.g., a microphone jack), an audio output (e.g., a headphone jack), and a video output (e.g., a HDMI port) for sending signals to or receiving signals from an external device.

FIG. 13B is a block diagram illustrating the architecture of one aspect of a mobile computing device. That is, the mobile computing device 1300 can incorporate a system (e.g., an architecture) 1302 to implement some aspects. In one embodiment, the system 1302 is implemented as a "smart phone" capable of running one or more applications (e.g., browser, e-mail, calendaring, contact managers, messaging clients, games, and media clients/players). In some aspects, the system 1302 is integrated as a computing device, such as an integrated personal digital assistant (PDA) and wireless phone.

One or more application programs 1366 may be loaded into the memory 1362 and run on or in association with the operating system 1364. Examples of the application programs include phone dialer programs, e-mail programs, personal information management (PIM) programs, word processing programs, spreadsheet programs, Internet browser programs, messaging programs, and so forth. The system 1302 also includes a non-volatile storage area 1368 within the memory 1362. The non-volatile storage area 1368 may be used to store persistent information that should not be lost if the system 1302 is powered down. The application programs 1366 may use and store information in the non-volatile storage area 1368, such as e-mail or other messages used by an e-mail application, and the like. A synchronization application (not shown) also resides on the system 1302 and is programmed to interact with a corresponding synchronization application resident on a host computer to keep the information stored in the non-volatile storage area 1368 synchronized with corresponding information stored at the host computer. As should be appreciated, other applications may be loaded into the memory 1362 and run on the mobile computing device 1300 described herein (e.g., search engine, extractor module, relevancy ranking module, answer scoring module, etc.).

The system 1302 has a power supply 1370, which may be implemented as one or more batteries. The power supply 1370 might further include an external power source, such as an AC adapter or a powered docking cradle that supplements or recharges the batteries.

The system 1302 may also include a radio interface layer 1372 that performs the function of transmitting and receiving radio frequency communications. The radio interface layer 1372 facilitates wireless connectivity between the system 1302 and the "outside world," via a communications carrier or service provider. Transmissions to and from the radio interface layer 1372 are conducted under control of the operating system 1364. In other words, communications received by the radio interface layer 1372 may be disseminated to the application programs 1366 via the operating system 1364, and vice versa.

The visual indicator 1320 may be used to provide visual notifications, and/or an audio interface 1374 may be used for producing audible notifications via an audio transducer. In the illustrated embodiment, the visual indicator 1320 is a light emitting diode (LED) and the audio transducer is a speaker. These devices may be directly coupled to the power supply 1370 so that when activated, they remain on for a duration dictated by the notification mechanism even though the processor 1360 and other components might shut down for conserving battery power. The LED may be programmed to remain on indefinitely until the user takes action to indicate the powered-on status of the device. The audio interface 1374 is used to provide audible signals to and receive audible signals from the user. For example, in addition to being coupled to the audio transducer, the audio interface 1374 may also be coupled to a microphone to receive audible input, such as to facilitate a telephone conversation. In accordance with embodiments of the present disclosure, the microphone may also serve as an audio sensor to facilitate control of notifications, as will be described below. The system 1302 may further include a video interface 1376 that enables an operation of an on-board camera 1330 to record still images, video stream, and the like.

A mobile computing device 1300 implementing the system 1302 may have additional features or functionality. For example, the mobile computing device 1300 may also include additional data storage devices (removable and/or non-removable) such as, magnetic disks, optical disks, or tape. Such additional storage is illustrated in FIG. 13B by the non-volatile storage area 1368.

Data/information generated or captured by the mobile computing device 1300 and stored via the system 1302 may be stored locally on the mobile computing device 1300, as described above, or the data may be stored on any number of storage media that may be accessed by the device via the radio interface layer 1372 or via a wired connection between the mobile computing device 1300 and a separate computing device associated with the mobile computing device 1300, for example, a server computer in a distributed computing network, such as the Internet. As should be appreciated such data/information may be accessed via the mobile computing device 1300 via the radio interface layer 1372 or via a distributed computing network. Similarly, such data/information may be readily transferred between computing devices for storage and use according to well-known data/information transfer and storage means, including electronic mail and collaborative data/information sharing systems.

Figure 14:
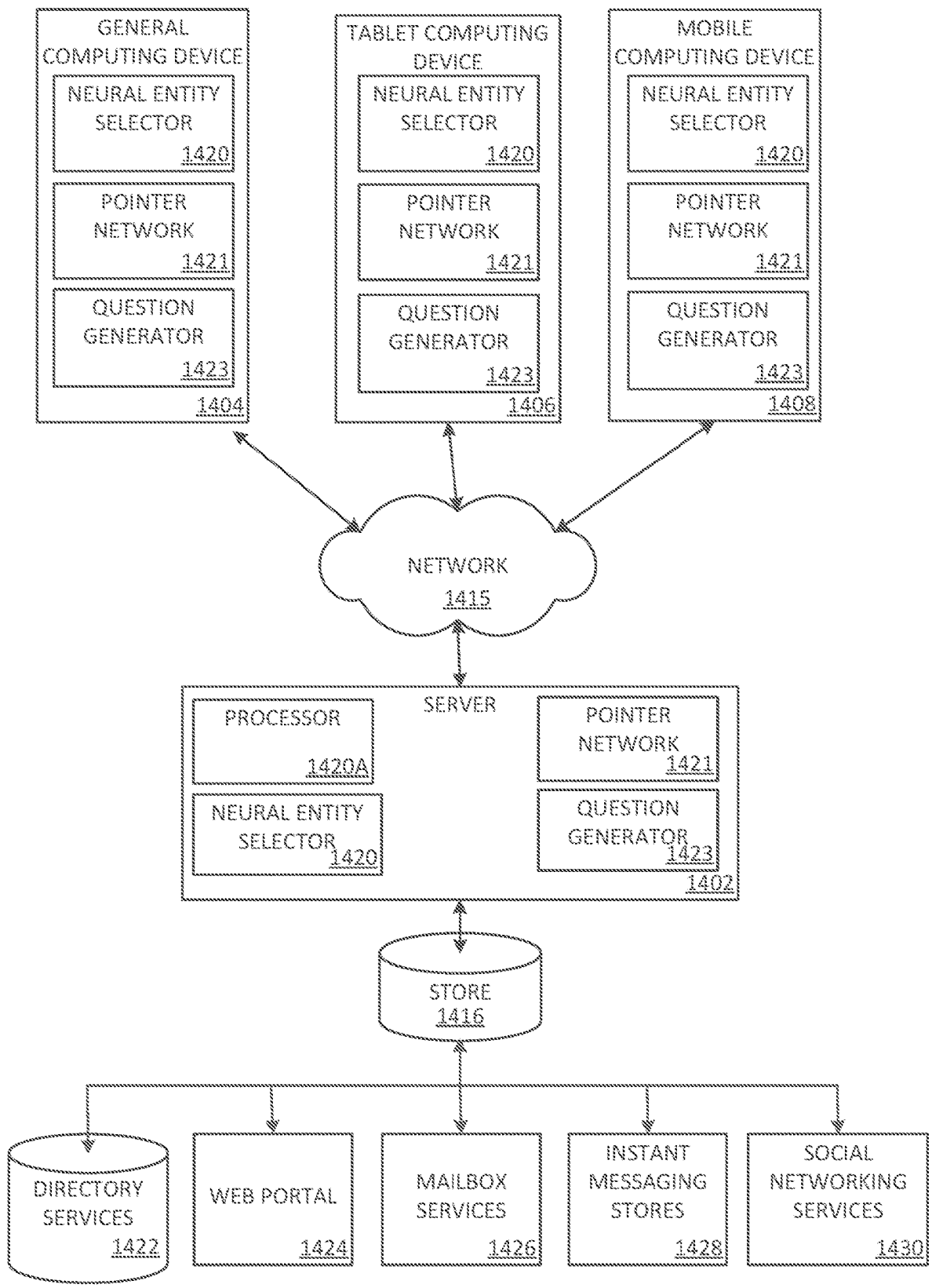
FIG. 14 is a simplified block diagram of a distributed computing system in which aspects of the present disclosure may be practiced.

FIG. 14 illustrates one aspect of the architecture of a system for processing data received at a computing system from a remote source, such as a personal computer 1404, tablet computing device 1406, or mobile computing device 1408, as described above. Content displayed at server device 1402 may be stored in different communication channels or other storage types. For example, various documents may be stored using a directory service 1422, a web portal 1424, a mailbox service 1426, a virtual reality store 1428, or a social networking site 1430.

A neural entity selector 1420, pointer network 1421, and question generator 1423 may be employed by a client that communicates with server device 1402, and/or the neural entity selector 1420, pointer network 1421, and question generator 1423 may be employed by server device 1402. The server device 1402, which also can include processor 1420a, may provide data to and from a client computing device such as a personal computer 1404, a tablet computing device 1406 and/or a mobile computing device 1408 (e.g., a smart phone) through a network 1415. By way of example, the computer system described above may be embodied in a personal computer 1404, a tablet computing device 1406, a mobile computing device 808 (e.g., a smart phone), and/or an HMD 1410. Any of these embodiments of the computing devices may obtain content from the store 1416, in addition to receiving graphical data useable to be either pre-processed at a graphic-originating system, or post-processed at a receiving computing system.

Figure 15:
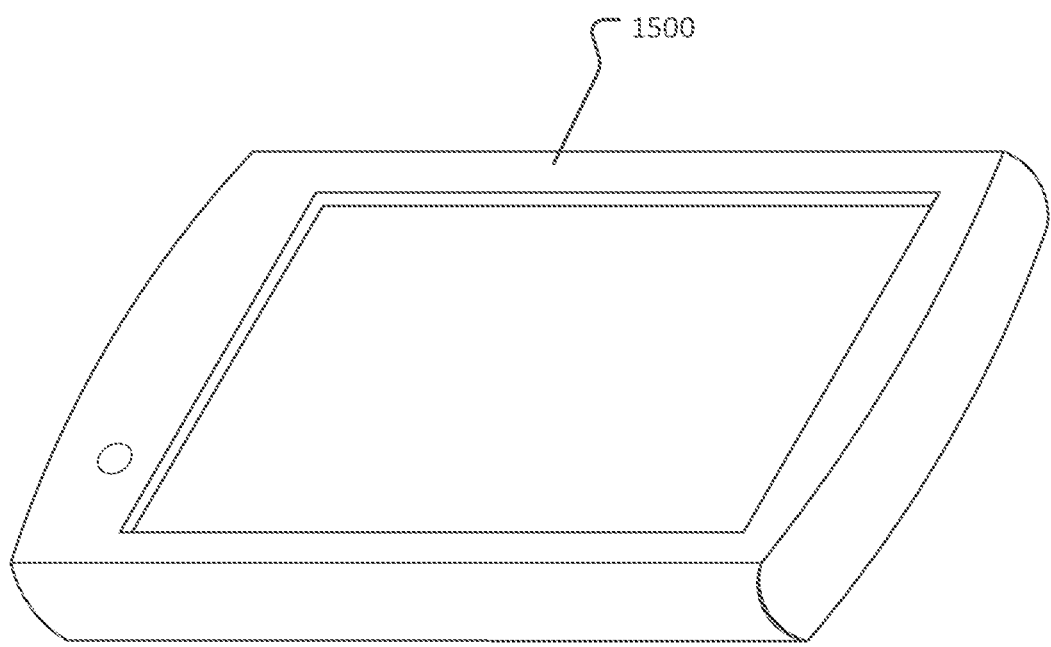
FIG. 15 illustrates a tablet computing device for executing one or more aspects of the present disclosure.

FIG. 15 illustrates an exemplary tablet computing device 1500 that may execute one or more aspects disclosed herein in connection with a virtual reality device. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Conclusion

Described herein is a multi-stage (e.g., two-stage) framework to address the problem of question generation from documents. First, a question answering corpus is used to train a neural model to estimate the distribution of key phrases that are interesting to question-asking humans. Thus, there is an estimation of the probability of "interesting" answers in the document using the neural model trained on the question answering corpus. Potential answers are identified automatically versus relying on manual identification. In one example embodiment two neural models are employed, one that ranks entities proposed by an entity tagger, and another that points to key-phrase start and end boundaries with a pointer network. When compared to an entity tagging baseline, the proposed models exhibit significantly better results.

A sequence-to-sequence model is employed according to an example aspect herein to generate questions in natural language conditioned on the key phrases selected in the first stage. That is, the predicted key phrases are used as answers to condition the sequence-to-sequence question generation model. The question generator employs an attention-based translation model, and uses the pointer-softmax mechanism to dynamically switch between copying a word from the document and generating a word from a vocabulary. Notably, the two-stage pipeline described herein generates a question given a document only, and an answer is automatically identified by the pointer network (as a set of things that one can potentially ask interesting questions about).

Qualitative examples show that the generated questions exhibit both syntactic fluency and semantic relevance to the conditioning documents and answers, and appear useful for assessing reading comprehension in educational settings. Empirically, the neural key phrase detection models herein significantly outperform an entity-tagging baseline system. The question generator formulates good quality natural language questions from extracted key phrases. The resulting questions and answers can be used to, for example, assess reading comprehension in educational settings.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The invention claimed is:

1. A method executed by a computer processor, for generating questions based on provided content, the method comprising:

automatically extracting, by the computer processor, a key phrase from the provided content retrieved from a memory device, by a first trained machine learning model, wherein the first trained machine learning model generates a set of key-phase boundaries in a first sequence of words of the provided content, and the first trained machine learning model is trained using question-answering data set retrieved from the memory device;

generating by a second trained machine learning model, a question in natural language using the extracted key phrase as an input and as an answer to the question through one or more iterations of interpolating a second sequence of words in the question,
wherein the second trained machine learning model predicts a likelihood of a subsequent word in a sentence being generated as the question, the second trained machine learning model uses a combination including words from the provided content and words from a vocabulary; and transmitting the generated question to an application causing an output device to output the generated question.

2. The method of claim 1, wherein the first trained machine learning model is based at least upon a first probability of an entity in the provided content being an answer conditioned on the provided content, wherein the second trained machine learning model is a sequence-to-sequence model for generating one or more boundaries of key phrases, and wherein the entity comprises a word in the provided content.

3. The method of claim 2, the method further comprising conditioning a question generation model based on the key phrases, wherein the question generation model is used as the second trained machine learning model for generating the question.

4. The method of claim 1, the method further comprising:
receiving a set of questions and answers using cloud sourcing, and
conditioning the first trained machine learning model for training using the received set of questions and answers.

5. The method of claim 4, wherein the first trained machine learning model includes a neural model, and wherein the neural model has been trained on a dataset comprising human-selected key phrases.

6. The method of claim 1, further comprising identifying a start location and an end location of the key phrases in the provided content.

7. The method of claim 6, wherein the identifying includes performing a dot product attention mechanism parameterizing a probability distribution.

8. The method of claim 1, further comprising determining an attention distribution of word positions in the provided content, wherein the generating includes providing at least one word of the question based on the attention distribution.

9. The method of claim 1, wherein the provided content includes a document.

10. A system for generating questions based on provided content, comprising:
a pointer network to automatically extract, by a computer processor, a key phrase from the provided content retrieved from a memory device, by a first trained machine learning model,
wherein the first trained machine learning model generates a set of key-phrase boundaries in a first sequence of words of question-answering data set in the provided content retrieved from the memory device;
a question generator to generate, by a second trained machine learning model, a question in natural language using the extracted key phrase as an input and as an answer to the question through one or more iterations of interpolating a second sequence of words in the question, wherein the second trained machine learning model is trained te predicts a likelihood of a subsequent word in a sentence being generated as the question, the second trained machine learning model uses a combination including words from the provided content and words from a vocabulary; and
transmitting the generated question to an application causing an output device to output the generated question.

11. The system of claim 10, wherein the first trained machine learning model is based at least upon a first probability of an entity in the provided content being an answer conditioned on the provided content, wherein the second trained machine learning model is a sequence-to-sequence model for generating one or more boundaries of key phrases, wherein the entity comprises a word in the provided content, and wherein the pointer network identifies start and end locations of the key phrases in the provided content.

12. The system of claim 10, wherein the pointer network comprises:
an encoder for encoding the provided content; and
a decoder to extract the key phrases.

13. The system of claim 10, wherein the question generator comprises:
an encoder for encoding the provided content; and
a decoder to generate the question.

14. The system of claim 13, wherein the decoder includes an attention mechanism.

15. The system of claim 13, wherein the decoder includes a Long Short Term Memory (LSTM).

16. The system of claim 10, wherein the pointer network receives a set of questions and answers using cloud sourcing and conditions the first trained machine learning model for training using the received set of questions and answers.

17. A storage device storing a program having instructions which, when executed by a computer processor, cause the processor to execute a method for generating questions based on provided content, comprising:
automatically extracting, by the computer processor, a key phrase from the provided content retrieved from a memory device, by a first trained machine learning model,
wherein the first trained machine learning model generates a set of key-phrase boundaries in a first sequence of words of the provided content, the first trained machine learning model is trained using question-answering data set retrieved from the memory device;
generating by a second trained machine learning model, a question in natural language using the extracted key phrase as an input and as an answer to the question through one or more iterations of interpolating a second sequence of words in the question,
wherein the second trained machine learning model predicts a likelihood of a subsequent word in a sentence being generated as the question, the second trained machine learning model uses a combination including words from the provided content and words from a vocabulary; and
transmitting the generated question to an application causing an output device to output the generated question.

18. The storage device of claim 17, wherein the first trained machine learning model is based at least upon a first probability of an entity in the provided content being an answer conditioned on the provided content, wherein the second trained machine learning model is a sequence-to-sequence model for generating one or more boundaries of key phrases, and wherein the entity comprises a word in the provided content.

19. The storage device of claim 17, wherein the instructions further cause the processor to execute a method comprising conditioning a question generation model based on the key phrases, wherein the question generation model is used as the second trained machine learning model for generating the question.

20. The storage device of claim 17, the instructions further cause the processor to execute a method comprising:
   receiving a set of questions and answers using cloud sourcing; and
   conditioning the first trained machine learning model for training using the received set of questions and answers.

* * * * *